US011983892B2

(12) United States Patent
Takama

(10) Patent No.: US 11,983,892 B2
(45) Date of Patent: May 14, 2024

(54) INFORMATION PROCESSING APPARATUS AND INFORMATION PROCESSING METHOD FOR DETECTING A STATE CHANGE OF A IMAGING APPARATUS

(71) Applicant: CANON KABUSHIKI KAISHA, Tokyo (JP)

(72) Inventor: Yasufumi Takama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 16/922,923

(22) Filed: Jul. 7, 2020

(65) Prior Publication Data
US 2021/0012519 A1 Jan. 14, 2021

(30) Foreign Application Priority Data

Jul. 11, 2019 (JP) .................. 2019-129613

(51) Int. Cl.
*G06K 9/00* (2022.01)
*G06T 5/50* (2006.01)
(Continued)

(52) U.S. Cl.
CPC .................. *G06T 7/55* (2017.01); *G06T 5/50* (2013.01); *G06T 7/80* (2017.01); *G06T 17/00* (2013.01);
(Continued)

(58) Field of Classification Search
CPC .... G06T 7/55; G06T 5/50; G06T 7/80; G06T 17/00; G06T 2200/04; G06T 7/564;
(Continued)

(56) References Cited

U.S. PATENT DOCUMENTS

2018/0053347 A1\* 2/2018 Fathi .................... G06T 7/60
2019/0311471 A1\* 10/2019 Kurabayashi ......... G06T 7/0002
(Continued)

FOREIGN PATENT DOCUMENTS

| JP | 2003271993 A | 9/2003 |
| JP | 2015045920 A | 3/2015 |
| JP | 2019102845 A | 6/2019 |

OTHER PUBLICATIONS

Antone, Matthew E., and Seth Teller. "Automatic recovery of relative camera rotations for urban scenes." Proceedings IEEE Conference on Computer Vision and Pattern Recognition. CVPR 2000 (Cat. No. PR00662). vol. 2. IEEE, 2000. (Year: 2000).\*

*Primary Examiner* — Andrew M Moyer
(74) *Attorney, Agent, or Firm* — Canon U.S.A., Inc. IP Division

(57) ABSTRACT

An information processing apparatus acquires a plurality of images that is based on image capturing performed by a plurality of imaging apparatuses, acquires three-dimensional shape data of an object which is generated based on the plurality of images and states of the plurality of imaging apparatuses obtained at a time point earlier than a time point of the image capturing, detects that a state of any one of the plurality of imaging apparatuses obtained at a time point of the image capturing is different from a state thereof obtained at a time point earlier than a time point of the image capturing, based on the acquired plurality of images and the acquired three-dimensional shape data, and outputs information that is based on a result of the detection.

16 Claims, 16 Drawing Sheets

(51) Int. Cl.
   *G06T 7/55*       (2017.01)
   *G06T 7/80*       (2017.01)
   *G06T 17/00*      (2006.01)
   *H04N 23/661*     (2023.01)

(52) U.S. Cl.
   CPC ....... *H04N 23/661* (2023.01); *G06T 2200/04* (2013.01)

(58) Field of Classification Search
   CPC ............ G06T 2200/08; H04N 5/23206; H04N 5/23222; H04N 5/232939; H04N 5/247
   See application file for complete search history.

(56) References Cited

U.S. PATENT DOCUMENTS

2020/0088582 A1*  3/2020  Schlegel ................... G06T 7/74
   2020/0342610 A1* 10/2020  Wu ......................... G06F 3/017
   2022/0067974 A1*  3/2022  Gunkel .................. G06F 3/017

* cited by examiner

FIG.8

VOXEL
*800*

| 2 | 2 | 2 | 2 |
|---|---|---|---|
| 2 | 3 | 3 | 3 |
| 2 | 3 | 3 | 3 |
| 2 | 3 | 3 | 3 |

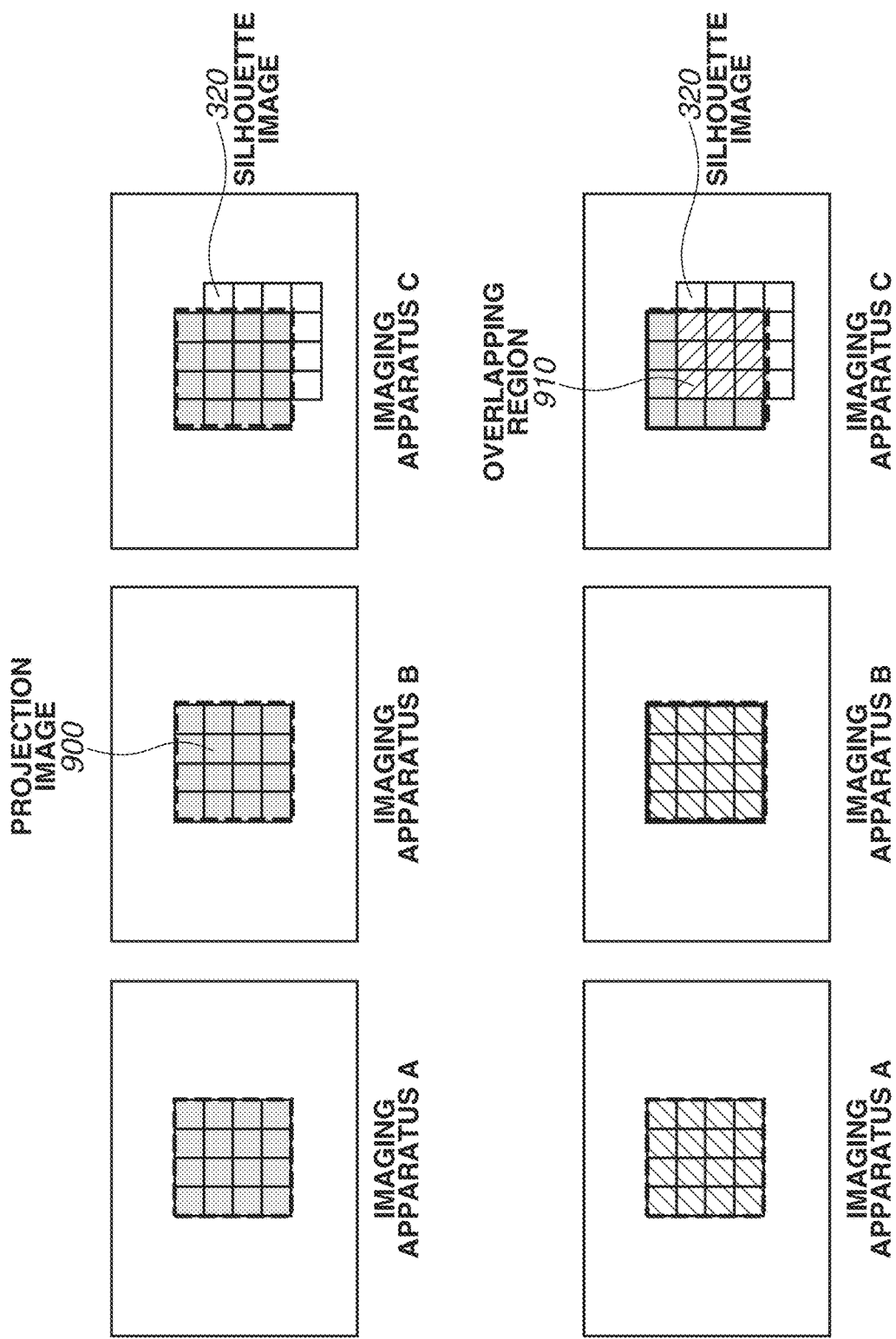

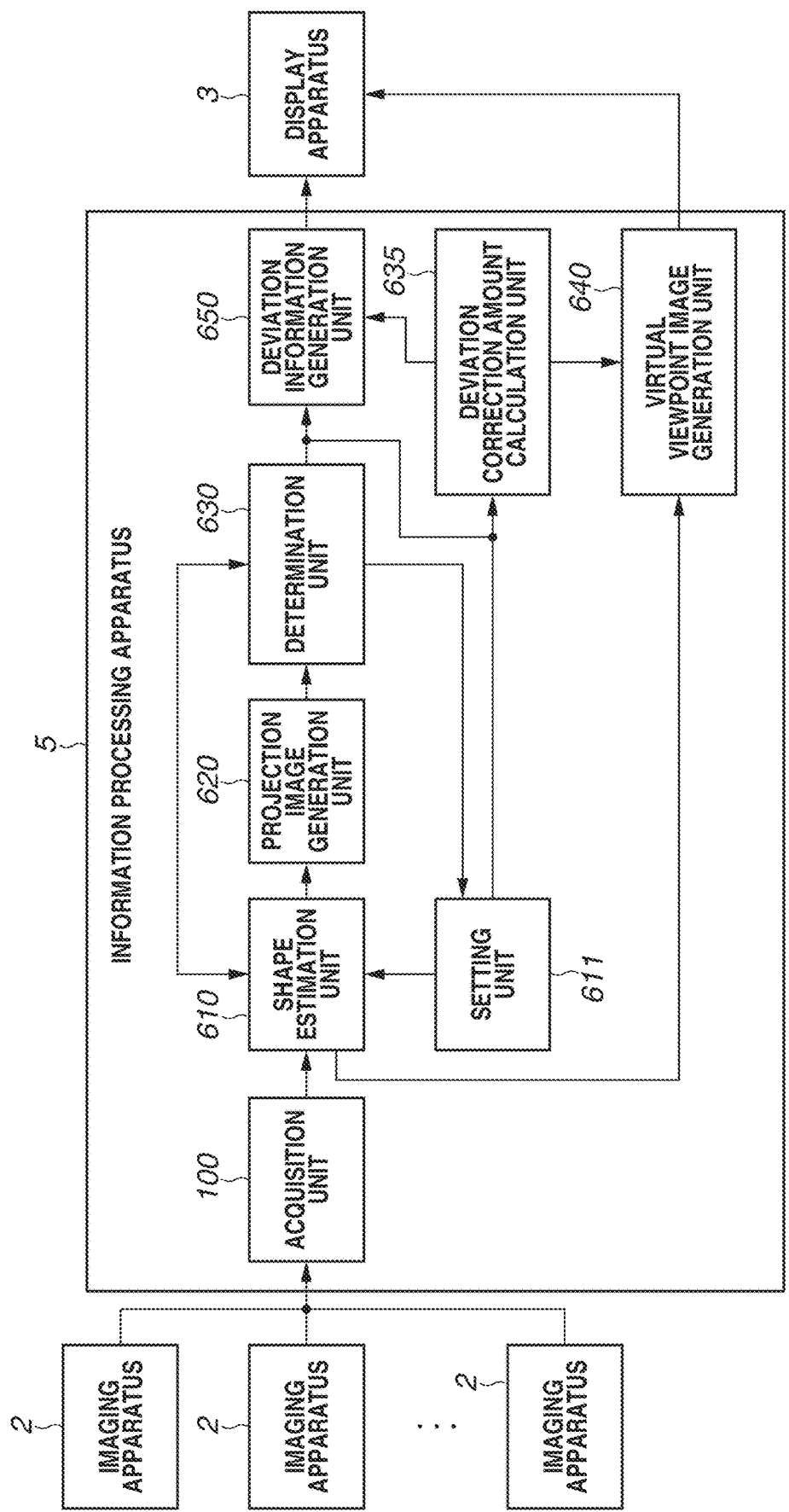

INFORMATION PROCESSING APPARATUS AND INFORMATION PROCESSING METHOD FOR DETECTING A STATE CHANGE OF A IMAGING APPARATUS

BACKGROUND

Field of the Disclosure

Aspects of the present disclosure generally relate to an information processing apparatus.

Description of the Related Art

A technique to generate a virtual viewpoint image viewed from a virtual viewpoint designated by the user with use of a plurality of images obtained by a plurality of imaging apparatuses performing image capturing has been attracting attention. Japanese Patent Application Laid-Open No. 2015-45920 discusses a method of generating a virtual viewpoint image by locating a plurality of imaging apparatuses in respective different positions, causing the plurality of imaging apparatuses to perform image capturing of an object, and using a three-dimensional shape of the object which is estimated from captured images obtained by image capturing.

To estimate a three-dimensional shape, usually, the state of each imaging apparatus is previously acquired, so that the three-dimensional shape is estimated based on the acquired state of each imaging apparatus and a plurality of captured images. The acquired state of each imaging apparatus includes states of, for example, a position and an orientation (what is called external parameters) and states of, for example, a focal length, an image center, and a distortion (what is called internal parameters).

After the state of an imaging apparatus is previously acquired, the state of the imaging apparatus might change from the previously acquired state, for example, due to the imaging apparatus coming into contact with a person, due to the imaging apparatus being vibrated by, for example, the wind, or due to the self-weight of a lens of the imaging apparatus. If, in spite of the state of the imaging apparatus having changed, the estimation of the three-dimensional shape of an object is performed based on the previously acquired state of the imaging apparatus, the accuracy of an estimated shape may decrease. Therefore, although a technique to detect a change in the state of an imaging apparatus is being demanded, such a technique still has not been proposed.

SUMMARY

Aspects of the present disclosure are generally directed to providing a technique to detect a change in the state of an imaging apparatus.

According to an aspect of the present disclosure, an information processing apparatus includes a first acquisition unit configured to acquire a plurality of images that is based on image capturing performed by a plurality of imaging apparatuses, a second acquisition unit configured to acquire three-dimensional shape data of an object which is generated based on the plurality of images and states of the plurality of imaging apparatuses obtained at a time point earlier than a time point of the image capturing, a detection unit configured to detect that a state of any one of the plurality of imaging apparatuses obtained at a time point of the image capturing is different from a state thereof obtained at a time point earlier than a time point of the image capturing, based on the plurality of images acquired by the first acquisition unit and the three-dimensional shape data acquired by the second acquisition unit, and an output unit configured to output information that is based on a result of detection performed by the detection unit.

Further features of the present disclosure will become apparent from the following description of exemplary embodiments with reference to the attached drawings.

BRIEF DESCRIPTION OF THE DRAWINGS

FIG. 8 is a diagram illustrating an example of a shape estimation result in the second exemplary embodiment.

FIGS. 9A and 9B are diagrams illustrating an overlapping region between a projection image generated from a shape estimation result in the second exemplary embodiment and the region of an object in a silhouette image.

FIG. 11 is a diagram illustrating an example of a functional configuration of an information processing apparatus in a third exemplary embodiment.

DESCRIPTION OF THE EMBODIMENTS

Figure 1:
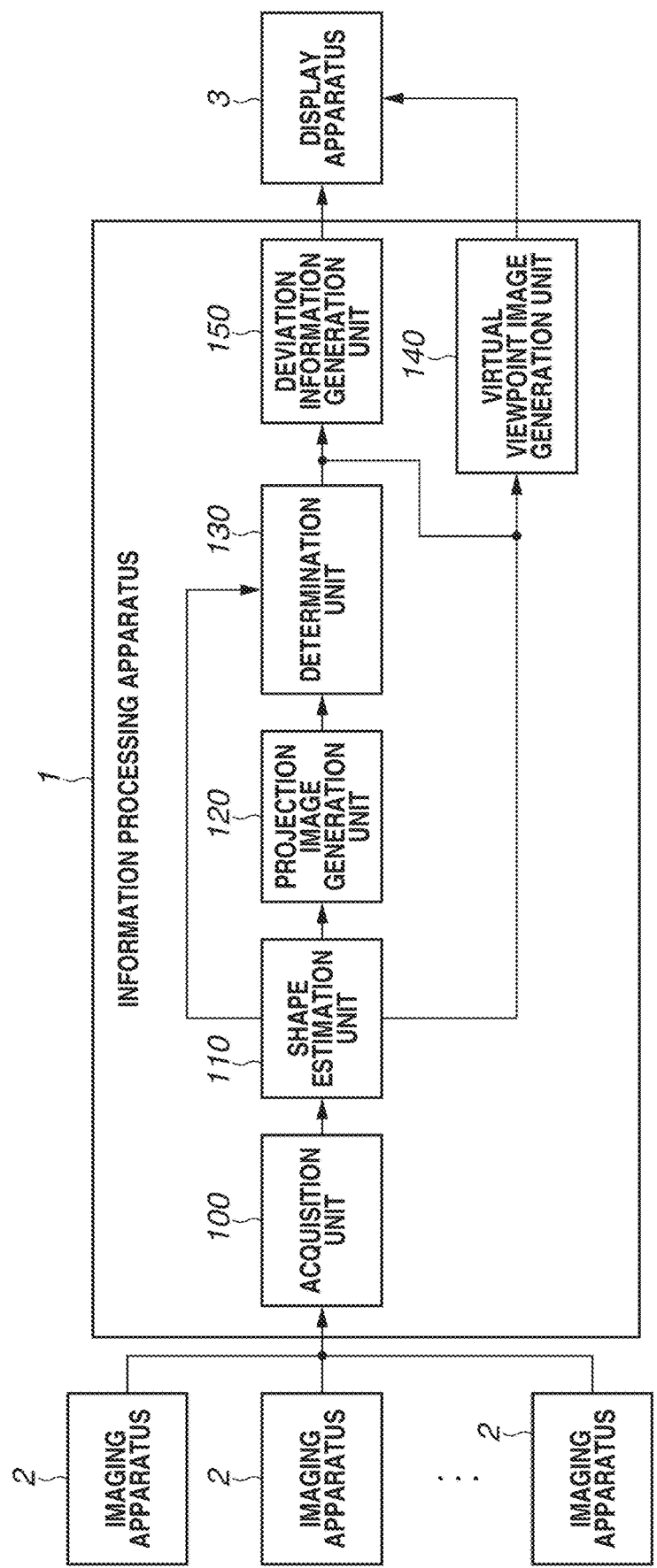
FIG. 1 is a diagram illustrating an example of a functional configuration of an information processing apparatus in a first exemplary embodiment.

Various exemplary embodiments, features, and aspects of the disclosure will be described in detail below with reference to the drawings. Furthermore, the following exemplary embodiments are not intended to limit the disclosure, and not all of the combinations of features described in the respective exemplary embodiments are essential for solutions in the disclosure. Furthermore, the same constituent elements are assigned the respective same reference characters for concise explanation.

In a first exemplary embodiment, a configuration of estimating a three-dimensional shape of an object, detecting a deviation between a projection image obtained by projecting a result of the estimation onto a viewpoint of an imaging apparatus and a silhouette image that is based on image capturing performed by the imaging apparatus, and displaying information indicating that a deviation has occurred on a screen is described. This deviation is information indicating that the state of the imaging apparatus has changed. Here, the state of the imaging apparatus refers to states of, for example, the position, orientation (direction or image capturing direction), focal length, image center, and distortion of the imaging apparatus. The position and orientation (direction or image capturing direction) of the imaging apparatus can be controlled by the imaging apparatus itself, or can be controlled by a camera platform, which controls the position and orientation of an imaging apparatus. While, in the following description, the state of the imaging apparatus is described as parameters of the imaging apparatus, the parameters can include parameters which are controlled by another apparatus such as a camera platform. Moreover, parameters concerning the position and orientation (direction or image capturing direction) of the imaging apparatus are what is called external parameters, and parameters concerning the focal length, image center, and distortion of the imaging apparatus are what is called internal parameters.

Moreover, a change in the state of the imaging apparatus refers to a change in parameters of the imaging apparatus occurring between two clock times. Estimation of the three-dimensional shape of an object is performed based on an image that is based on image capturing performed by the imaging apparatus and parameters of the imaging apparatus acquired earlier than the image capturing. The above-mentioned change refers to that the parameters of the imaging apparatus acquired at the time of the image capturing and the parameters of the imaging apparatus acquired earlier than the image capturing differ from each other. For example, consider a case where, at first clock time, parameters of the imaging apparatus has been acquired for estimation of the three-dimensional shape. That parameters of the imaging apparatus acquired at second clock time in a period for image capturing which is started after the first clock time differ from parameters of the imaging apparatus acquired at the first clock time is referred to as that there is a change in parameters of the imaging apparatus. Moreover, a case where parameters of the imaging apparatus acquired in between two clock times in a period for image capturing differ from each other is also referred to as that there is a change in parameters of the imaging apparatus.

Furthermore, the state (parameters) of the imaging apparatus can be the state (parameters) of the imaging apparatus itself, or can be control information about the imaging apparatus which is set by, for example, a camera platform, which controls the position and orientation of an imaging apparatus.

An image processing system in the first exemplary embodiment is a system which generates a virtual viewpoint image representing a view observed from a designated virtual viewpoint, based on a plurality of images that is based on image capturing performed by a plurality of imaging apparatuses and the designated virtual viewpoint. The virtual viewpoint image in the first exemplary embodiment is also called a free viewpoint video image, but is not limited to an image corresponding to a viewpoint freely (optionally) designated by the user, and, for example, an image corresponding to a viewpoint selected by the user from, for example, a plurality of candidates is also included in the virtual viewpoint image. Moreover, designation of a virtual viewpoint can be performed by a user operation, or can be automatically performed based on, for example, a result of image analysis. Moreover, while, in the first exemplary embodiment, description focuses on a case where the virtual viewpoint image is a moving image, the virtual viewpoint image can be a still image.

Virtual viewpoint information to be used for generation of a virtual viewpoint image is information indicating the position and orientation of a virtual viewpoint. Specifically, the virtual viewpoint information is a parameter set including parameters representing the three-dimensional position of the virtual viewpoint and parameters representing the orientation of the virtual viewpoint in pan, tilt, and roll directions. Furthermore, the contents of the virtual viewpoint information are not limited to the above-mentioned ones. For example, a parameter set serving as virtual viewpoint information can include parameters representing the magnitude of a field of view (angle of view) of the virtual viewpoint. Moreover, the virtual viewpoint information can include a plurality of parameter sets. For example, the virtual viewpoint information can include a plurality of parameter sets respectively corresponding to a plurality of frames constituting a moving image composed of virtual viewpoint images and can be information indicating the positions and orientations of the virtual viewpoint respectively obtained at a plurality of successive time points.

The image processing system includes a plurality of imaging apparatuses which performs image capturing of an imaging region from a plurality of directions. The imaging region is, for example, a playing field in which, for example, soccer or karate is played or a stage on which a concert or theatrical play is performed. The plurality of imaging apparatuses is installed at respective different positions in such a way as to surround such an imaging region, and performs image capturing in synchronization. Furthermore, a plurality of imaging apparatuses does not need to be installed all around the imaging region, but can be installed in some directions of the imaging region depending on, for example, a restriction of the installation location. Moreover, the number of imaging apparatuses is not limited, and, for example, in a case where the imaging region is an athletic field for soccer, about several tens to several hundreds of imaging apparatuses can be installed around the athletic field. Moreover, imaging apparatuses having respective different functions, such as a telephoto camera and a wide-angle camera, can be installed.

A virtual viewpoint image is generated, for example, by the following method. First, the method causes a plurality of imaging apparatuses to acquire a plurality of images (plural viewpoint images) by performing image capturing from respective different directions. Next, the method acquires, from the plural viewpoint images, a foreground image obtained by extracting a foreground region corresponding to a predetermined object such as a person or a ball and a background image obtained by extracting a background region, which is a region other than the foreground region. Each of the foreground image and the background image has texture information (for example, color information). Then, the method generates, based on the foreground image, a foreground model representing a three-dimensional shape of the predetermined object and texture data used for coloring the foreground model. Moreover, the method generates, based on the background image, texture data used for coloring the background model representing a three-dimensional shape of the background such as an athletic field. Then, the method performs mapping of the texture data with respect to the foreground model and the background model and performs rendering thereof according to a virtual viewpoint indicated by the virtual viewpoint information, thus generating a virtual viewpoint image. However, the method of generating a virtual viewpoint image is not limited to this, but can include various methods, such as a method of generating a virtual viewpoint image using projection transform of a captured image without using a three-dimensional model.

The foreground image is an image obtained by extracting a region of an object (foreground region) from a captured image acquired by an imaging apparatus performing image capturing. The object to be extracted as the foreground region refers to a dynamic object (dynamic body) which has a motion in the case of image capturing being performed from the same direction in a time-series manner (the absolute position or shape of which is changeable). The object is, for example, a person such as an athlete or referee present in a field in which a game is played, including a ball in addition to a person in the case of a ball game, or is, for example, a singer, player, performer, or master of ceremony in the case of a concert or entertainment.

The background image is an image of a region (background region) different from at least an object serving as a foreground. Specifically, the background image is an image obtained by removing an object serving as a foreground from a captured image. Moreover, the background refers to an image capturing target which remains still or continues to be in a state close to a still state in the case of image capturing being performed from the same direction in a time-series manner. Such an image capturing target is, for example, a stage used for, for example, a concert, a stadium used for an event such as a game, a structure such as a goal used for a ball game, or a field. However, the background is a region different from at least an object serving as a foreground, and the image capturing target can also include, in addition to an object and a background, for example, another physical body.

[Configuration]

In the first exemplary embodiment, an information processing apparatus which is used in the image processing apparatus is described with reference to the drawings.

FIG. 1 is a diagram illustrating an example of a functional configuration of the information processing apparatus in the first exemplary embodiment. The information processing apparatus 1 is connected to a plurality of imaging apparatuses 2 and a display apparatus 3. The information processing apparatus 1 acquires a captured image or a foreground image from each of the plurality of imaging apparatuses 2. Moreover, the information processing apparatus 1 generates a virtual viewpoint image based on, for example, pieces of information obtained from the plurality of imaging apparatuses 2, and outputs the generated virtual viewpoint image to the display apparatus 3.

Each imaging apparatus 2 (in some cases, also referred to as a "camera") can include, in addition to an image capturing function, for example, another function such as the function of extracting a foreground image from a captured image and a hardware configuration (circuits or devices) for implementing such another function. The plurality of imaging apparatuses 2 is located in such a way as to perform image capturing of an object from respective different directions. The display apparatus 3 acquires a virtual viewpoint image generated by the information processing apparatus 1 and deviation information described below, and outputs the virtual viewpoint image and the deviation information with use of a display device such as a display.

A configuration of the information processing apparatus 1 is described. The information processing apparatus 1 includes an acquisition unit 100, a shape estimation unit 110, a projection image generation unit 120, a determination unit 130, a virtual viewpoint image generation unit 140, and a deviation information generation unit 150. The acquisition unit 100 acquires captured images (or foreground images) obtained by the plurality of imaging apparatuses 2 performing image capturing. Each imaging apparatus 2 is assumed to have an identification number for identifying an individuality thereof. Moreover, all of the imaging apparatuses 2 are synchronized based on a single piece of clock time information in the real world, and, in a captured video image, an image of each frame is assigned image capturing time information.

The acquisition unit 100 acquires captured images acquired by the plurality of imaging apparatuses 2 performing image capturing. Moreover, the acquisition unit 100 can acquire a foreground image obtained by extracting a region representing an object from the captured image. Moreover, the acquisition unit 100 acquires respective parameters of the plurality of imaging apparatuses 2. These parameters can be acquired from the plurality of imaging apparatuses 2 or can be acquired from a storage device (not illustrated). Moreover, the acquisition unit 100 can be configured to calculate respective parameters of the plurality of imaging apparatuses 2. For example, the acquisition unit 100 calculates corresponding points from a plurality of captured images, performs optimization in such a manner that errors obtained when the corresponding points are projected onto the respective imaging apparatuses 2 become minimum, and calibrates the respective imaging apparatuses 2, thus calculating the respective parameters. Furthermore, the calibration method can be any existing method. Furthermore, the parameters can be acquired in synchronization with captured images, can be acquired at the stage of advance preparation, or can be acquired in an asynchronous manner with captured images as needed.

The shape estimation unit 110 estimates a three-dimensional shape of an object with use of a plurality of captured images acquired by the acquisition unit 100 and parameters. The projection image generation unit 120 generates a projection image obtained by projecting three-dimensional shape data, which is a result of estimation performed by the shape estimation unit 110, onto the respective viewpoints of the imaging apparatuses 2 with use of the parameters. Furthermore, in a case where foreground images are acquired by the acquisition unit 100, the shape estimation unit 110 can estimate a three-dimensional shape of an object with use of the foreground images instead of captured images.

The determination unit 130 detects a change in parameters of the imaging apparatus 2 in between two different timings. For example, the determination unit 130 detects a change between parameters of the imaging apparatus 2 previously acquired at the stage of advance preparation for image capturing and parameters of the imaging apparatus 2 obtained at the time of image capturing which is started after completion of the preparation. Then, when having detected a deviation, the determination unit 130 determines whether to generate a virtual viewpoint image or to stop generation of a virtual viewpoint image and generate deviation information, depending on the detected deviation. Specifically, the determination unit 130 compares a projection image of an object generated by the projection image generation unit 120 with a region of the object in a silhouette image which is generated based on a captured image acquired by the acquisition unit 100. The captured image is an image in which parameters of the imaging apparatus 2 obtained at the time point of image capturing have been reflected. Therefore, the silhouette image is also an image in which parameters of the imaging apparatus 2 obtained at the time point of image capturing have been reflected. On the other hand, the projection image of an object generated by the projection image generation unit 120 is an image in which parameters of the imaging apparatus 2 obtained at a time point earlier than the time point of image capturing, for example, at the stage of advance preparation for image capturing, have been reflected. Therefore, the determination unit 130 is able to detect a change in parameters of the imaging apparatus 2 by comparing a projection image of an object generated by the projection image generation unit 120 with a region of the object in a silhouette image which is generated based on a captured image acquired by the acquisition unit 100.

The silhouette image is an image representing a two-dimensional shape of an object, and is an image corresponding to a viewpoint of each imaging apparatus 2. Moreover, the silhouette image is an image in which, for example, the pixel value of a region in which an object is present is set as 255 and the pixel value of the other region is set as 0. In other words, the silhouette image is an image in which other than a region of an object has been masked, and is an image which does not have texture information. Furthermore, as long as a region in which an object is present is able to be distinguished from the other region, the respective pixel values thereof are not limited. The silhouette image can be acquired from each of the imaging apparatuses 2, or can be configured to be generated by the shape estimation unit 110 based on an image acquired from the imaging apparatus 2 (a captured image or a foreground image). In the following description, an example in which the silhouette image is generated by the shape estimation unit 110 is described. Furthermore, the acquisition unit 100 can be configured to acquire a silhouette image from the imaging apparatus 2. In this case, the imaging apparatus 2 has the function of generating a silhouette image from a captured image.

To generate one virtual viewpoint image, the virtual viewpoint image generation unit 140 receives designation of one piece of virtual viewpoint information, and generates a virtual viewpoint image based on the virtual viewpoint information. For example, the virtual viewpoint information is designated by the user (operator) operating an input unit such as a joystick, jog dial, touch panel, keyboard, or mouse. Furthermore, the designation of virtual viewpoint information is not limited to this, and virtual viewpoint information can be automatically designated by, for example, recognition of an object. The generated virtual viewpoint image is output to the display apparatus 3. The deviation information generation unit 150 generates deviation information based on a deviation detected by the determination unit 130. The deviation information can also be, for example, text information.

Figure 15:
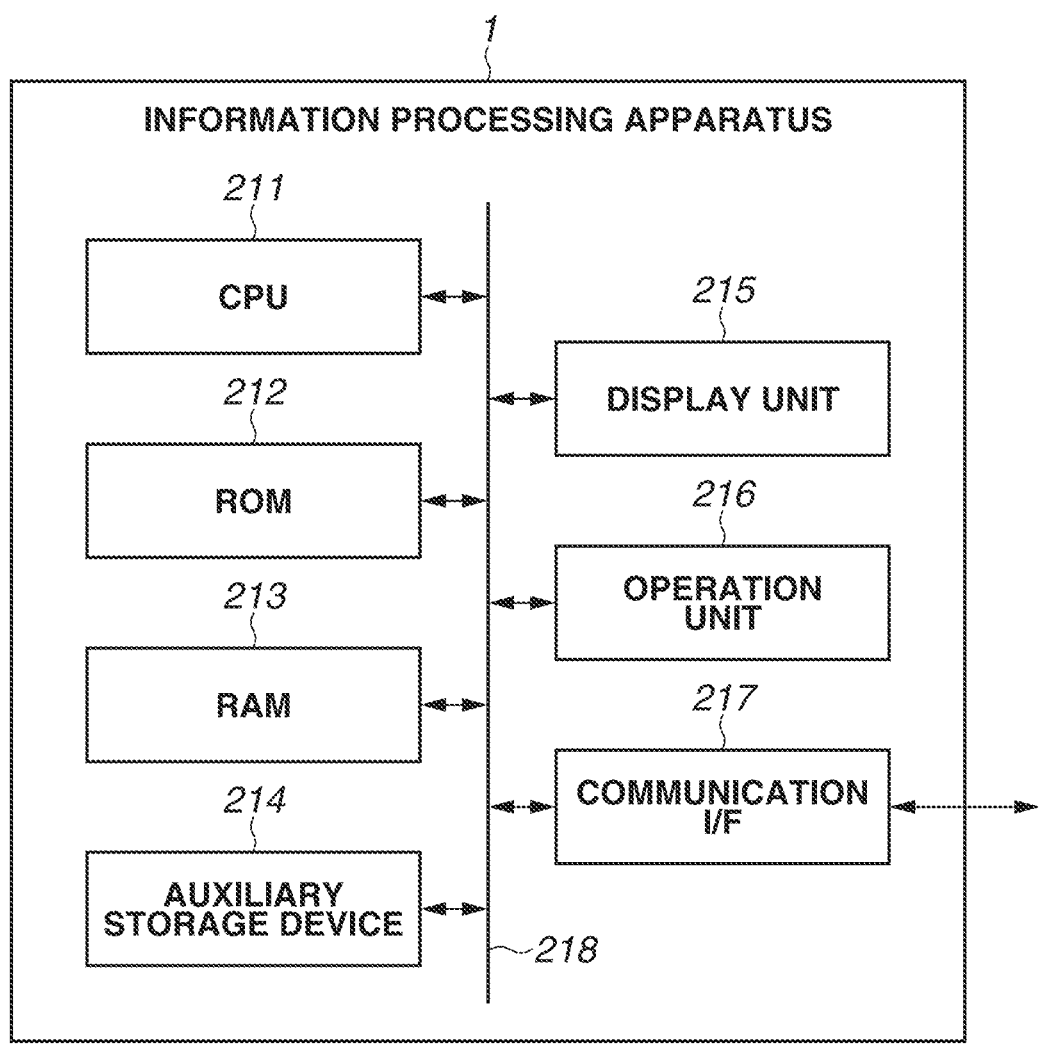
FIG. 15 is a diagram illustrating an example of a hardware configuration of the information processing apparatus in the first exemplary embodiment.

A hardware configuration of the information processing apparatus 1 is described with reference to FIG. 15. The information processing apparatus 1 includes a central processing unit (CPU) 211, a read-only memory (ROM) 212, a random access memory (RAM) 213, an auxiliary storage device 214, a display unit 215, an operation unit 216, a communication interface (I/F) 217, and a bus 218.

The CPU 211 controls the entire information processing apparatus 1 with use of computer programs and data stored in the ROM 212 and the RAM 213, thus implementing the respective functions of the information processing apparatus 1 illustrated in FIG. 1. Furthermore, the information processing apparatus 1 can include one or a plurality of pieces of dedicated hardware different from the CPU 211, and at least a part of processing operations which are performed by the CPU 211 can be performed by such dedicated hardware. Examples of dedicated hardware include an application specific integrated circuit (ASIC), a field-programmable gate array (FPGA), and a digital signal processor (DSP). The ROM 212 stores, for example, programs which are not required to be altered. The RAM 213 temporarily stores, for example, programs and data supplied from the auxiliary storage device 214 and data supplied from outside via the communication I/F 217. The auxiliary storage device 214 is configured with, for example, a hard disk drive, and stores various pieces of data, such as image data and audio data.

The display unit 215 is configured with, for example, a liquid crystal display or a light-emitting diode (LED), and displays, for example, a graphical user interface (GUI) used for the user to operate the information processing apparatus 1. The operation unit 216 is configured with, for example, a keyboard, a mouse, a joystick, or a touch panel, and receives an operation performed by the user and inputs various instructions to the CPU 211. The CPU 211 operates as a display control unit which controls the display unit 215 and an operation control unit which controls the operation unit 216.

The communication I/F 217 is used to perform communication with an apparatus located outside the information processing apparatus 1. For example, in a case where the information processing apparatus 1 is connected to an outside apparatus by wired connection, a communication cable is connected to the communication I/F 217. In a case where the information processing apparatus 1 has the function of wirelessly communicating with an outside apparatus, the communication I/F 217 is equipped with an antenna. The bus 218 interconnects various units of the information processing apparatus 1 and is used to transfer information therebetween.

While, in the first exemplary embodiment, the display unit 215 and the operation unit 216 are assumed to be present inside the information processing apparatus 1, at least one of the display unit 215 and the operation unit 216 can be present as another apparatus outside the information processing apparatus 1.

[Operation Flow]

Processing which is performed by the information processing apparatus 1 is described with reference to a flowchart illustrated in FIG. 2.

In step S200, the acquisition unit 100 acquires a plurality of captured images from the plurality of imaging apparatuses 2. Moreover, the acquisition unit 100 can be configured to receive foreground images extracted by the imaging apparatuses 2. Moreover, the foreground images can be configured to be extracted from the captured images by the acquisition unit 100.

In step S210, the acquisition unit 100 acquires parameters of the respective imaging apparatuses 2 from a storage device (not illustrated). Furthermore, the acquisition unit 100 can be configured to calculate the parameters. However, in that case, the parameters do not need to be calculated each time the captured images are acquired, but only need to be calculated at least once before shape estimation is performed. Then, the calculated parameters can be stored in the storage device. The acquisition unit 100 can acquire parameters of the respective imaging apparatuses 2 from the storage device at the next and subsequent times. The acquired captured images (or foreground images) and parameters are output to the shape estimation unit 110 and the virtual viewpoint image generation unit 140.

In step S220, the shape estimation unit 110 estimates the three-dimensional shape of an object based on the plurality of captured images and the parameters of the respective imaging apparatuses 2. Specifically, the shape estimation unit 110 generates three-dimensional shape data about the object. The three-dimensional shape data, which is a result of shape estimation, is output to the determination unit 130 and the virtual viewpoint image generation unit 140.

Shape estimation processing in the first exemplary embodiment is configured with processing for generating a silhouette image of an object and processing for estimating a three-dimensional shape of the object. The silhouette image can be generated with use of a general method such as a background difference method which calculates, from a captured image obtained by performing image capturing of an object, a difference from a background image obtained by previously performing image capturing when there is no object, for example, before starting of a game. However, the method of generating a silhouette image is not limited to this. For example, the method of, for example, recognizing an object (human body) can be used to extract a region of the object.

Moreover, in a case where the acquisition unit 100 acquires foreground images, since the foreground images have both shape information and texture information about the object, a silhouette image is generated by eliminating the texture information. Specifically, the shape estimation unit 110 can set the pixel value of a region in which an object is present as 255 and set the pixel value of the other region as 0. Moreover, a silhouette image can be acquired by the acquisition unit 100, and, in that case, processing for generating a silhouette image of an object can be omitted.

Next, the shape estimation unit 110 estimates a three-dimensional shape of the object with use of the generated silhouette images corresponding to the respective imaging apparatuses 2 and the parameters of the respective imaging apparatuses 2. The method for estimation of a three-dimensional shape to be used can include a volume intersection method (shape from silhouette). However, the estimation of a three-dimensional shape can be performed by use of a general method other than the volume intersection method.

Figure 3:
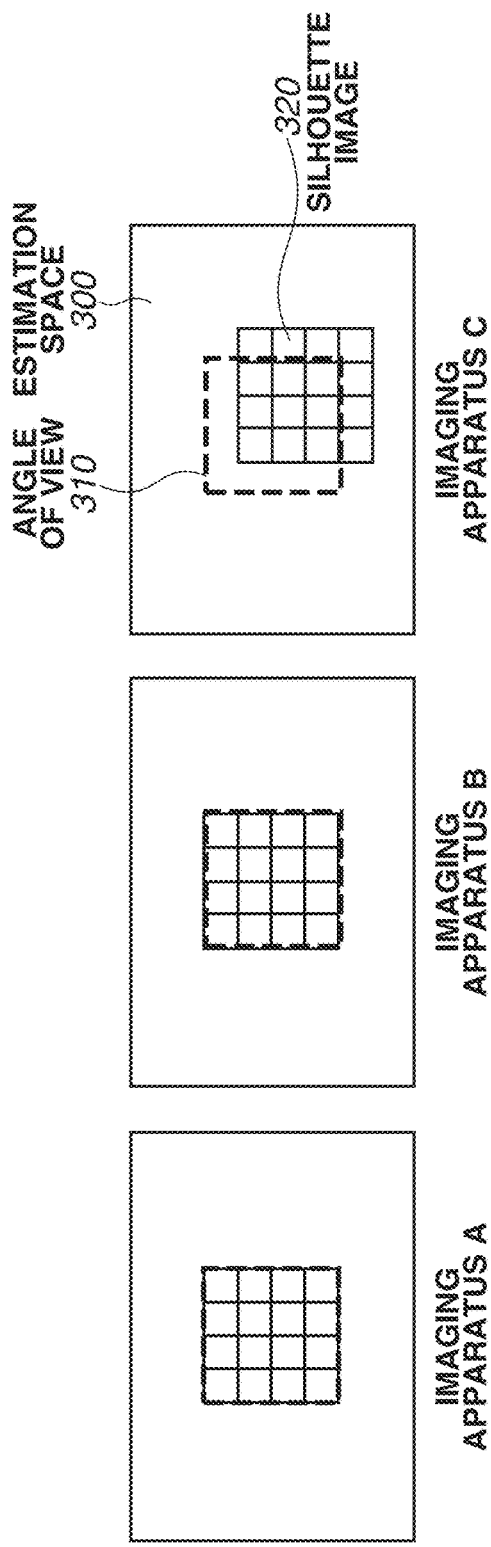
FIGS. 3A and 3B are diagrams used to explain shape estimation processing performed in the first exemplary embodiment.

FIG. 3A is a diagram illustrating examples of an estimation space 300 in shape estimation processing, an angle of view 310 (dashed line) of each imaging apparatus calculated from the parameters of three imaging apparatuses, and a silhouette image 320 (solid line). Furthermore, the silhouette image 320 indicates an example of an image composed of four pixels in both horizontal and vertical directions. The silhouette image 320 includes a silhouette indicating a two-dimensional shape of an object. FIG. 3B is a diagram illustrating shape data which is generated by the shape estimation unit 110 with use of silhouette images 320 obtained from three imaging apparatuses illustrated in FIG. 3A. Furthermore, while, in FIGS. 3A and 3B, for convenience of explanation, shape estimation processing in a two-dimensional space is described, the same also applies to that in a three-dimensional space. Furthermore, for ease of explanation, a region of the object is assumed to be present throughout the silhouette image 320, in many silhouette images 320, a region of the object is present in a part of each silhouette image 320.

In the examples illustrated in FIG. 3A, there is no deviation between the angle of view 310 and the silhouette image 320 with respect to the imaging apparatuses A and B out of three imaging apparatuses. On the other hand, there is a deviation between the angle of view 310 and the silhouette image 320 with respect to the imaging apparatus C. In FIG. 3B, the value of each voxel 400 in the voxel space composed of four pixels in both horizontal and vertical directions is determined under the following condition. Specifically, when each voxel is projected onto each imaging apparatus with use of parameters of the respective imaging apparatuses, in a case where a pixel or region corresponding to the voxel is included in all of the silhouette images 320 obtained from three imaging apparatuses, the value of the voxel is set to 1, and, in the other cases, the value of the voxel is set to 0. Actually, the voxel 400 has three-dimensional coordinates Xw (x, y, z), and those coordinates are expressed by a world coordinate system having three orthogonal axes with an optional point in the real world set as the origin. This processing is repeated throughout all of the voxels of the estimation space 300. Then, voxels having the value "1" such as those illustrated in FIG. 3B are left as voxels constituting an object and voxels having the value "0" are deleted, so that three-dimensional shape data about an object is generated. Thus, the three-dimensional shape data is represented by only the voxels having the value "1".

In step S230, the projection image generation unit 120 generates projection images in the plurality of imaging apparatuses 2 based on the parameters of the plurality of imaging apparatuses 2 and the estimated three-dimensional shape data. The generated projection images are output to the determination unit 130. Specifically, the projection image generation unit 120 generates projection images in the respective imaging apparatuses 2 by projecting the three-dimensional shape data onto the respective imaging apparatuses 2 with use of the parameters of the respective imaging apparatuses 2. The projection images are output to the determination unit 130.

Figure 4:
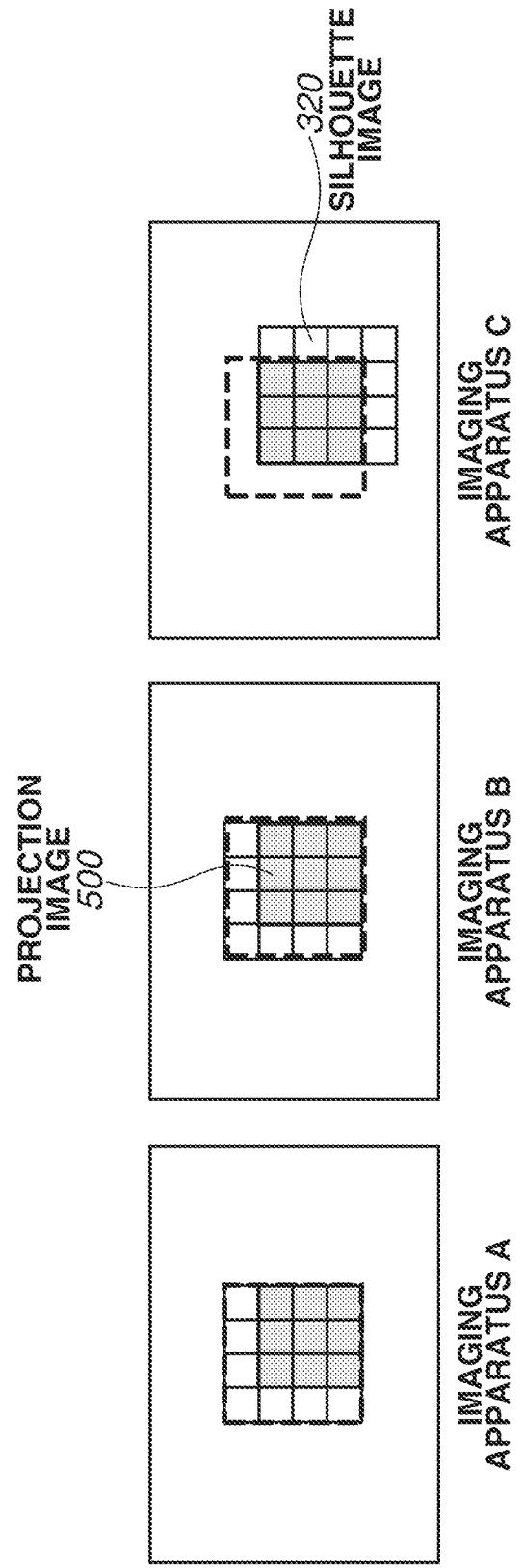
FIG. 4 is a diagram illustrating examples of projection images generated from a shape estimation result in the first exemplary embodiment.

FIG. 4 is a schematic diagram illustrating projection images which are generated by projecting three-dimensional shape data about an object to the respective three imaging apparatuses illustrated in FIG. 3A. Processing for the projection image generation unit 120 to generate projection images is described with reference to FIG. 4. Furthermore, in FIG. 4, silhouette images (regions of an object) obtained from the respective imaging apparatuses are also illustrated while being superimposed on the projection images. First, the projection image generation unit 120 initializes all of the pixel values of projection images obtained from all of the imaging apparatuses with 0. Next, the projection image generation unit 120 converts the voxel of three-dimensional shape data from three-dimensional coordinates expressed by a world coordinate system into two-dimensional coordinates expressed by an image coordinate system of each imaging apparatus with use of the parameters of the respective imaging apparatuses. Thus, only the voxels having the value "1" illustrated in FIG. 3B are converted into an image coordinate system of each imaging apparatus. This processing is performed throughout all of the voxels. Referring to FIG. 4, in coordinates obtained by conversion, a region corresponding to the voxels having the value "1" is hatched in gray. This region hatched in gray indicates a projection image 500 of the object obtained by three-dimensional shape data being projected onto each imaging apparatus. Additionally, the above-mentioned projection processing is performed with respect to all of the imaging apparatuses 2, so that projection images of the object are generated. Furthermore, in each projection image, the pixel value of a region hatched in gray is 255.

In step S240, the determination unit 130 determines whether the parameters of any one of the plurality of imaging apparatuses 2 have changed. Specifically, the determination unit 130 compares a silhouette image of the object and a projection image thereof with each other for each imaging apparatus 2, and calculates a deviation therebetween. The determination unit 130 evaluates a result of such calculation. Then, the determination unit 130 determines whether to generate a virtual viewpoint image or to generate deviation information without generating a virtual viewpoint image.

The determination unit 130 counts, for each imaging apparatus 2, the number of pixels in which the pixel value of a region of the object in the silhouette image 320 (in FIG. 3A, the same as the silhouette image 320) is 255 and the number of pixels in which the pixel value of the projection image 500 of the object is 255. Then, the determination unit 130 calculates the proportion of the number of pixels counted in the projection image 500 to the number of pixels counted in the region of the object in the silhouette image 320, and sets the calculated proportion as a deviation in each imaging apparatus 2. Furthermore, the method of calculating a deviation is not limited to this.

In the volume intersection method employed in shape estimation processing, voxels are projected onto a silhouette image, and only the voxels which have been determined to be within the region (silhouette) of the object with respect to all of the imaging apparatuses 2 are estimated to be the shape of the object. Thus, as a deviation between the region of the object and the projection image is smaller, the proportion to be calculated is closer to 1.0, and, conversely, as the deviation becomes larger, the proportion to be calculated becomes smaller. The statistical value of deviations of the entirety of the plurality of imaging apparatuses 2 is able to be expressed by using, for example, the average value, maximum value, or minimum value of deviations calculated in the respective imaging apparatuses 2.

The determination unit 130 compares a threshold value previously set by the user and a statistical value of deviations of the entirety of the plurality of imaging apparatuses 2 with each other. In a case where the statistical value of deviations of the entirety of the plurality of imaging apparatuses 2 is smaller than the threshold value, the determination unit 130 determines that a change in parameters is occurring in any imaging apparatus 2 out of the plurality of imaging apparatuses 2 at that time (YES in step S240), and then advances the processing to step S260. In a case where the statistical value of deviations of the entirety of the plurality of imaging apparatuses 2 is larger than the threshold value, the determination unit 130 determines that no change in parameters is occurring in any imaging apparatus 2 out of the plurality of imaging apparatuses 2 at that time (NO in step S240), and then advances the processing to step S250.

In step S250, the virtual viewpoint image generation unit 140 generates a virtual viewpoint image based on captured images obtained from the plurality of imaging apparatuses 2, the parameters of the respective imaging apparatuses 2, the three-dimensional shape data, and the designated virtual viewpoint information. The generated virtual viewpoint image is output to the display apparatus 3. Furthermore, in a case where the acquisition unit 100 acquires foreground images, the virtual viewpoint image generation unit 140 can perform the following processing using the foreground images instead of the captured images.

The method of generating a virtual viewpoint image is described. The virtual viewpoint image generation unit 140 performs processing for generating a foreground virtual viewpoint image (a virtual viewpoint image of an object region) and processing for generating a background virtual viewpoint image (a virtual viewpoint image of other than the object region). Then, the virtual viewpoint image generation unit 140 superimposes the foreground virtual viewpoint image on the generated background virtual viewpoint image, thus generating a virtual viewpoint image.

First, the method of generating a foreground virtual viewpoint image of the virtual viewpoint image is described. The foreground virtual viewpoint image is able to be generated by presuming that a voxel is a three-dimensional point, calculating the color of the three-dimensional point, and performing rendering of the colored voxel by an existing computer graphics (CG) rendering method. To allocate color to a voxel, first, in an imaging apparatus 2 in which a point P (coordinates Xw) to which to allocate color is included in the angle of view thereof, coordinates Xw are converted into a coordinate system of the captured image, so that coordinates Xi on the captured image are calculated. If the pixel value of the coordinates Xi in a silhouette image obtained from the imaging apparatus 2 is 255 (within a silhouette), the pixels of the captured image are set as color of the point P. If the point P is within the angle of view in the plurality of imaging apparatuses 2, pixel values are acquired from captured images obtained from the respective imaging apparatuses 2, and, for example, the average value of the acquired pixel values is set as color of the point P. Repeating the same processing with respect to all of the voxels enables allocating colors to all of the voxels constituting three-dimensional shape data. However, the method of calculating color is not limited to this. For example, the method of using, instead of an average value, pixel values of a captured image acquired from an imaging apparatus 2 located closest to a virtual viewpoint can be used.

Next, the method of generating a background virtual viewpoint image of the virtual viewpoint image is described. To generate a background virtual viewpoint image, three-dimensional shape data about a background such as an athletic field is acquired. Three-dimensional shape data about a background to be used includes a CG model previously created about, for example, an athletic field and then stored in a system. Normal vectors of respective planes constituting a CG model and orientation vectors of the respective imaging apparatuses 2 are compared with each other, and an imaging apparatus 2 in which the respective planes are contained in the angle of view thereof and which faces the CG model in the most direct way is selected. Then, vertex coordinates of the planes are projected onto the selected imaging apparatus 2, so that a texture image to be pasted on the planes is generated, and, then, rendering is performed by an existing texture mapping method, so that a background virtual viewpoint image is generated. Then, the foreground virtual viewpoint image is superimposed on the background virtual viewpoint image acquired in the above-mentioned way, so that a virtual viewpoint image is generated.

In step S260, the deviation information generation unit 150 generates information that is based on a result of detection performed by the determination unit 130 (hereinafter referred to as "deviation information"). For example, the deviation information generation unit 150 generates information indicating that parameters have changed in any imaging apparatus 2 out of the plurality of imaging apparatuses 2. Such information is output to the display apparatus 3. Examples of the deviation information include text information such as "change in parameters of an imaging apparatus" or "deviation occurring" and frame information having the same image size as that of a virtual viewpoint image. The deviation information can include information for prompting the user to correct the parameters of the imaging apparatus 2. Specifically, the deviation information can include information for prompting the user to re-perform calculation of the parameters of the imaging apparatus 2 or for prompting the user to re-adjust, for example, the position and orientation of the imaging apparatus 2.

In step S270, the virtual viewpoint image generation unit 140 outputs the generated virtual viewpoint image to the display apparatus 3 or the deviation information generation unit 150 outputs the generated deviation information to the display apparatus 3. The output virtual viewpoint image or deviation information is displayed on, for example, a display by the display apparatus 3. Furthermore, while an example in which the virtual viewpoint image and the deviation information are output to a shared display apparatus 3 has been described, the virtual viewpoint image and the deviation information can be output to respective different display apparatuses 3. Moreover, the virtual viewpoint image can be output to a display apparatus 3 other than the display apparatus 3 illustrated in FIG. 1. For example, a virtual viewpoint image and deviation information can be output to a display apparatus 3 used for an administrator for the system, and the virtual viewpoint image which is output to the display apparatus 3 used for an administrator for the system can be output to a display apparatus for a viewer or a portable terminal owned by a viewer. In this case, instead of deviation information itself, information indicating an error can be output to the display apparatus for a viewer or the portable terminal owned by a viewer.

Then, in a case where there is no input deviation information, the display apparatus 3 displays only a virtual viewpoint image on the display. In a case where there is input deviation information, the display apparatus 3 displays the deviation information. Moreover, the display apparatus 3 can be configured not to display only deviation information but to display deviation information in superimposition on a virtual viewpoint image. However, in a case where the result of determination in step S240 is YES, since virtual viewpoint image generation processing is still not performed, the display apparatus 3 has still not acquired a virtual viewpoint image to be obtained at the latest time. In this case, the display apparatus 3 can display deviation information in superimposition on a virtual viewpoint image acquired one frame or more before. Alternatively, the display apparatus 3 can display deviation information using the set frame information in such a way as to surround a virtual viewpoint image.

The first exemplary embodiment facilitates recognizing that parameters of the imaging apparatus 2 have changed from the parameters thereof obtained at the time of calibration and thus enables determining, for example, the necessity of re-calibration of the imaging apparatus 2. Moreover, detecting such a deviation enables interrupting displaying of a virtual viewpoint image which is forecast to decrease in image quality.

While, in the above-described first exemplary embodiment, an example in which whether to generate a virtual viewpoint image or to generate deviation information is determined based on the statistical value of deviations of the entirety of the plurality of imaging apparatuses 2 has been described, the first exemplary embodiment is not limited to this. Not the statistical value of deviations of the entirety of the plurality of imaging apparatuses 2 but a deviation between a projection image calculated in a specific imaging apparatus 2 and a region of an object can be compared with a threshold value, and whether to generate a virtual viewpoint image or to generate deviation information can be determined depending on a difference between the deviation and the threshold value. Moreover, such a determination can be performed in the following way. Specifically, first, a deviation between a projection image calculated in each of two or more imaging apparatuses 2 and a region of an object is compared with a threshold value. Then, the number of imaging apparatuses 2 the parameters of which are considered to have changed is counted, and whether to generate a virtual viewpoint image or to generate deviation information is determined depending on the counted number.

Figure 5:
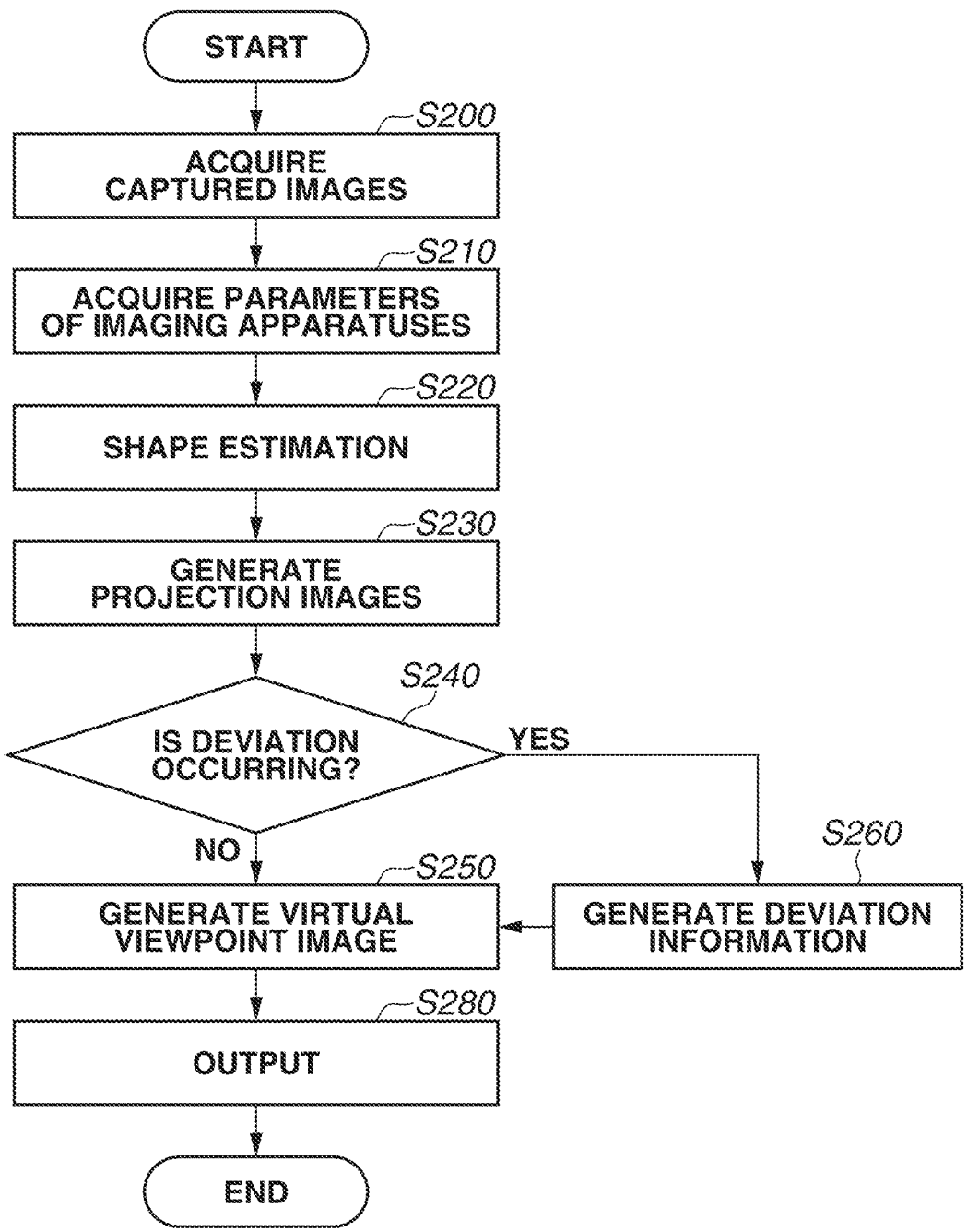
FIG. 5 is a flowchart illustrating another example of processing which is performed by the information processing apparatus in the first exemplary embodiment.

Moreover, even in a case where deviation information occurs, generating a virtual viewpoint image can be performed. In that case, for example, as illustrated in FIG. 5, after, in step S260, deviation information is generated by the deviation information generation unit 150, then in step S250, the virtual viewpoint image generation unit 140 can generate a virtual viewpoint image. Then, in step S280, the display apparatus 3 can display both the deviation information generated in step S260 and the virtual viewpoint image generated in step S250. In that case, if there is no input deviation information, the display apparatus 3 displays only the virtual viewpoint image on the display. On the other hand, if both the deviation information and the virtual viewpoint image have been input, the display apparatus 3 displays the deviation information in superimposition on the virtual viewpoint image or displays the deviation information using the frame information set in step S250 in such a way as to surround the virtual viewpoint image.

Moreover, step S240 and step S250 illustrated in FIG. 5 can be permuted. In that case, even if step S260 is to be performed, since a virtual viewpoint image has already been generated, the information processing apparatus 1 advances the processing from step S260 to step S280, in which the deviation information and the virtual viewpoint image are output to the display apparatus 3. Furthermore, if the result of determination in step S240 is NO, the virtual viewpoint image generated in step S250 is output to the display apparatus 3.

Moreover, while, in the above-described first exemplary embodiment, an example in which step S230 and step S240 are performed for every frame has been described, step S230 and step S240 can be performed for every predetermined number of frames or at every predetermined time interval. In a case where step S230 and step S240 are not performed, the information processing apparatus 1 performs the processing in the order of step S200, step S210, step S220, step S250, and step S270 (or step S280).

Moreover, in a case where it has been once determined that a deviation is occurring, if correcting the parameters of the imaging apparatus 2 is not performed, the generated deviation information can be configured to be continuously displayed. In a case where it has been determined that a deviation is occurring, in the next and subsequent frames, the operation flow illustrated in FIG. 2 can be omitted.

Moreover, the display apparatus 3 can be an apparatus which performs control and setting of parameters of the plurality of imaging apparatuses 2. In that case, correcting the parameters of the imaging apparatus 2 can be configured to be automatically performed based on the input deviation information. Specifically, for example, the position and orientation (direction) of the imaging apparatus 2 can be configured to be automatically adjusted to initial setting values. This configuration enables, without the need for the user to manually adjust, for example, the position and orientation (direction) of the imaging apparatus 2 to initial setting values, easily correcting the parameters of the imaging apparatus 2 to initial parameters.

In a second exemplary embodiment, an example of a configuration which counts the number of imaging apparatuses 2 the parameter of which have changed out of a plurality of imaging apparatuses 2 and displays pieces of identification information about the imaging apparatuses 2 the parameters of which have changed is described. Moreover, an example of a configuration which discriminates and displays the types of parameters of the imaging apparatuses 2 the parameters of which have changed and an example of a configuration which calculates an amount of correction for the parameters of the imaging apparatus 2 and generates a virtual viewpoint image based on the calculated amount of correction are described.

Hereinafter, a configuration of an information processing apparatus 4 according to the second exemplary embodiment is described with reference to FIG. 6. The information processing apparatus 4 includes an acquisition unit 100, a shape estimation unit 610, a setting unit 611, a projection image generation unit 620, a determination unit 630, a deviation correction amount calculation unit 635, a virtual viewpoint image generation unit 640, and a deviation information generation unit 650. In the following description, portions different from those in the first exemplary embodiment are described, and portions common to those in the first exemplary embodiment are omitted from description here. Furthermore, the information processing apparatus 4 is configured with the hardware configuration illustrated in FIG. 15, and the hardware configuration thereof is, therefore, omitted from description here.

The shape estimation unit 610 estimates a three-dimensional shape of an object based on a plurality of captured images (or foreground images) and parameters of the imaging apparatuses 2, as with the shape estimation unit 110 in the first exemplary embodiment. However, in shape estimation performed in the first exemplary embodiment, a method which, in a case where a voxel constituting a three-dimensional space is present within a silhouette obtained from all of the imaging apparatuses 2, estimates that the voxel is a voxel constituting three-dimensional shape data about the object is employed. In the second exemplary embodiment, a three-dimensional shape of the object is estimated by a method which counts, as the number of votes obtained, the number of voxels which have been projected into the silhouette. This method is a method which regards voxels the number of votes obtained of which exceeds a threshold value as voxels constituting three-dimensional shape data. This threshold value is set as a shape estimation parameter by the setting unit 611. The projection image generation unit 620 generates respective projection images for the plurality of imaging apparatuses 2 based on the parameters of the imaging apparatuses 2 and the three-dimensional shape data, as with the projection image generation unit 120 in the first exemplary embodiment.

The determination unit 630 estimates a deviation in the imaging apparatus 2, and, in a case where the shape estimation parameter is set, the determination unit 630 determines an imaging apparatus 2 the parameters of which have changed. Then, depending on the occurrence of a change in the parameters, the determination unit 630 determines whether to generate a virtual viewpoint image or to stop generation of a virtual viewpoint image and generate deviation information.

The deviation correction amount calculation unit 635 determines, based on a calculated deviation between the projection image and the region of the object in a silhouette image, in which of the external parameters and the internal parameters of the imaging apparatus 2 the deviation is occurring or whether the deviation occurring in both the external parameters and the internal parameters of the imaging apparatus 2. Moreover, the deviation correction amount calculation unit 635 calculates a deviation correction amount based on the calculated deviation.

The virtual viewpoint image generation unit 640 generates a virtual viewpoint image while applying the calculated deviation correction amount in a case where a deviation between the projection image and the region of the object in a silhouette image is occurring. The method of generating a virtual viewpoint image is similar to that in the first exemplary embodiment.

The deviation information generation unit 650 generates not only information indicating that a deviation has occurred but also information about the imaging apparatus 2 in which a deviation has occurred or information about the type of parameters of the imaging apparatus 2 in which a deviation has occurred.

Figure 6:
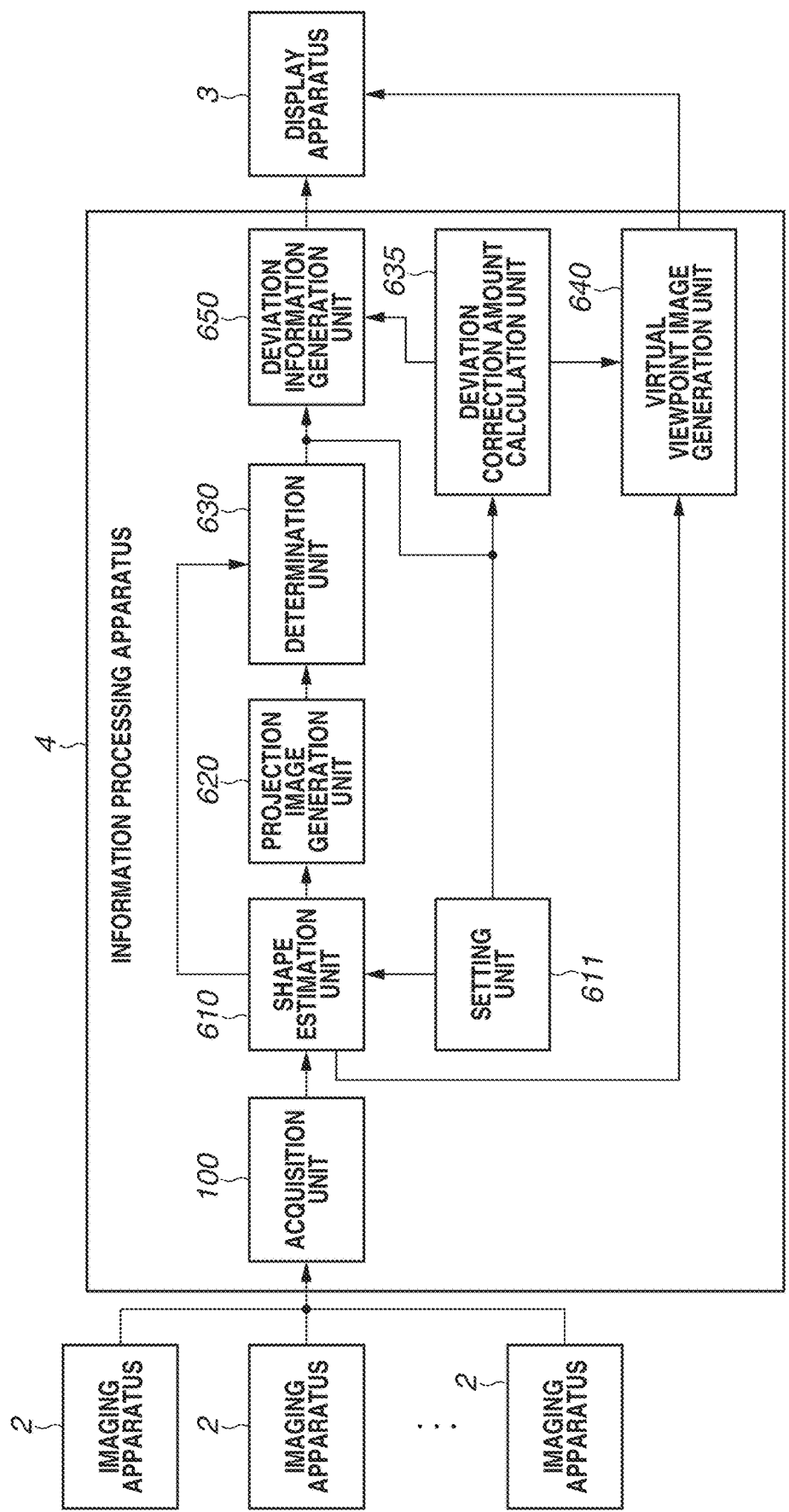
FIG. 6 is a diagram illustrating an example of a functional configuration of an information processing apparatus in a second exemplary embodiment.
Figure 7:
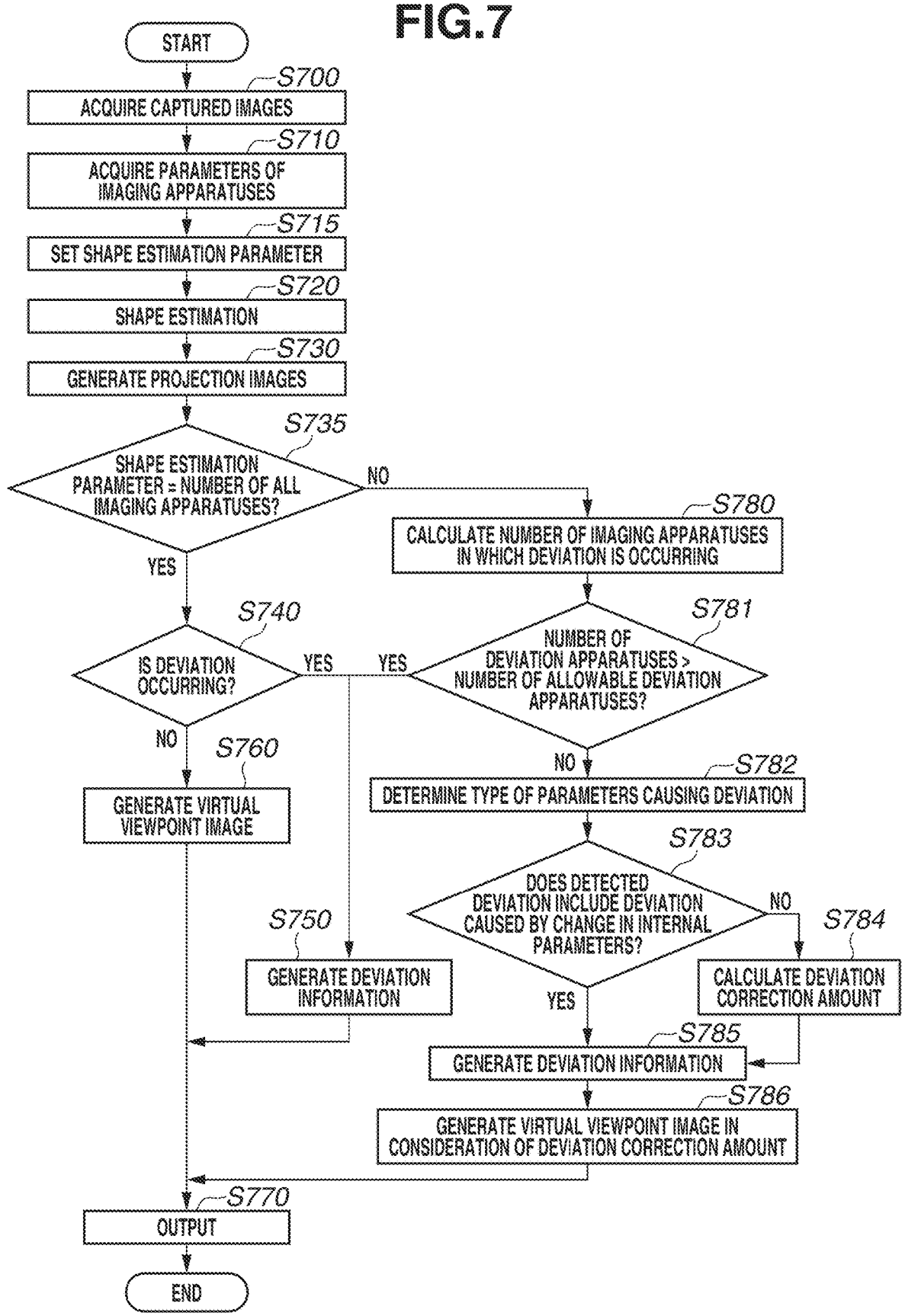
FIG. 7 is a flowchart illustrating an example of processing which is performed by the information processing apparatus in the second exemplary embodiment.

In the following description, details of the various units illustrated in FIG. 6 are described with reference to a flowchart illustrated in FIG. 7. Steps S700, S710, S720, S730, S740, S750, S760, and S770 are similar in processing to steps S200, S210, S220, S230, S240, S250, S260, and S270 in the first exemplary embodiment and are, therefore, omitted from description here.

In step S715, the setting unit 611 previously receives inputting of a shape estimation parameter for use in shape estimation processing via an input device such as a keyboard from the user (not illustrated), and sets the input shape estimation parameter. The set shape estimation parameter is output to the shape estimation unit 610. For example, if the shape estimation parameter indicates setting of two apparatuses, voxels which have been determined to be present within the region (silhouette) of the object with respect to two or more imaging apparatuses 2 are estimated to be a part of the object shape. The shape estimation processing in the first exemplary embodiment can also be said to be processing which is performed in a case where the shape estimation parameter indicates the number of all of the imaging apparatuses 2.

Figure 8:
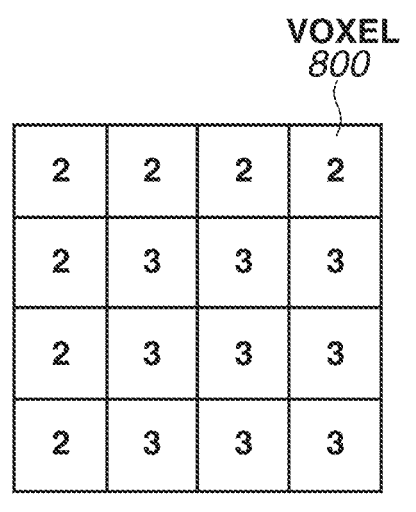

In step S720, the shape estimation unit 610 estimates a three-dimensional shape of the object based on not only a plurality of captured images (foreground images) and parameters of the respective imaging apparatuses 2 as with step S220 in the first exemplary embodiment but also the shape estimation parameter. The shape estimation unit 610 projects a voxel 800 illustrated in FIG. 8 onto the respective imaging apparatuses 2, and counts the number of times the voxel 800 is projected into a silhouette in each imaging apparatus 2 (the number of votes obtained). The value (the number of votes obtained) of the voxel 800 illustrated in FIG. 8 indicates the number of silhouette images in which a voxel has been projected into a region of the object in a silhouette image. Thus, a case where the voxel value is 3 indicates that a voxel has been projected into silhouettes in three imaging apparatuses. For example, in the case of silhouette images (the same as the region of the object) illustrated in FIG. 3A, with respect to voxels 800 which are projected onto only the imaging apparatuses A and B, the number of votes obtained becomes 2, so that the voxel value becomes 2. On the other hand, with respect to voxels 800 which are projected onto all of the imaging apparatuses A, B, and C, the number of votes obtained becomes 3, so that the voxel value also becomes 3. In a case where the shape estimation parameter is set as 2, the shape estimation unit 610 determines that voxels the number of votes obtained of which is 2 or greater out of the voxels 800 are voxels constituting three-dimensional shape data about the object. In other words, three-dimensional shape data is generated by leaving voxels the voxel value of which is 2 or greater and deleting voxels the voxel value of which is 1 or less. The three-dimensional shape data, which is a result of shape estimation, is output to the virtual viewpoint image generation unit 640.

In step S730, the projection image generation unit 620 generates projection images based on the three-dimensional shape data and the parameters of the plurality of imaging apparatuses 2. These projection images are output to the determination unit 630 and the deviation correction amount calculation unit 635. Processing for generating projection images is similar to that in step S230 in the first exemplary embodiment. However, in a case where the shape estimation parameter is set to 2 or greater, with respect to projection images of three-dimensional shape data onto the imaging apparatuses A, B, and C, projection images 900 such as those illustrated in FIG. 9A, which are different from those illustrated in FIG. 4, are obtained. Furthermore, in FIG. 9A, regions hatched in gray are projection images. Moreover, in FIG. 9A, silhouette images for the respective imaging apparatuses are also illustrated in superimposition. As illustrated in FIG. 9A, with respect to the imaging apparatuses A and B, the projection image 900 and the region of the object in the silhouette image 320 almost coincide with each other. On the other hand, with respect to the imaging apparatus C, a deviation is occurring between the projection image 900 and the region of the object in the silhouette image 320. Furthermore, even in FIG. 9A, an example in which the region of the object is present in the entire area of the silhouette image 320 is illustrated.

In step S735, the determination unit 630 checks the setting value of the shape estimation parameter. If the shape estimation parameter is set to the same value as the number of all of the imaging apparatuses 2 (YES in step S735), the determination unit 630 advances the processing to step S740, which is a processing flow similar to that in the first exemplary embodiment. If the shape estimation parameter is set to any other value (NO in step S735), the determination unit 630 advances the processing to step S780.

In step S780, the determination unit 630 compares the projection image of the object and the region of the object in a silhouette image and thus determines whether a deviation is occurring between the projection image and the region of the object in a silhouette image with respect to each imaging apparatus 2. Then, the determination unit 630 counts the number of imaging apparatuses 2 in which a deviation is occurring. While, in the first exemplary embodiment, whether a deviation is occurring in the entirety of the plurality of imaging apparatuses 2 is evaluated, in the second exemplary embodiment, whether a deviation is occurring is determined with respect to each of the plurality of imaging apparatuses 2.

The determination unit 630 calculates an overlapping region 910 between the projection image 900 and the region of the object in the silhouette image 320, as illustrated in FIG. 9B. In a case where, as in the imaging apparatuses A and B, the deviation between the projection image 900 and the region of the object in the silhouette image 320 is small, the numbers of pixels of the projection image 900 and the overlapping region 910 almost coincide with each other. However, in a case where, as in the imaging apparatus C, there is a deviation between the projection image 900 and the region of the object in the silhouette image 320, a difference occurs between the numbers of pixels of the projection image 900 and the overlapping region 910. An imaging apparatus in which this difference is smaller than a deviation determination threshold value is set as an imaging apparatus in which a deviation is occurring (the parameters of which have changed). Then, the determination unit 630 counts the number of imaging apparatuses in which a deviation is occurring and sets the counted number as the number of deviation apparatuses.

In step S781, the determination unit 630 determines whether the number of deviation apparatuses exceeds the number of allowable deviation apparatuses. If it is determined that the number of deviation apparatuses exceeds the number of allowable deviation apparatuses (YES in step S781), the determination unit 630 advances the processing to step S750. If it is determined that the number of deviation apparatuses is less than or equal to the number of allowable deviation apparatuses (NO in step S781), the determination unit 630 advances the processing to step S782. Here, the number of allowable deviation apparatuses is the number of apparatuses obtained by subtracting the value of the shape estimation parameter from the number of all of the imaging apparatuses 2. The number of deviation apparatuses and the numbers (imaging apparatus numbers) of the respective imaging apparatuses 2 in which a deviation is occurring are output to the deviation information generation unit 650 and the deviation correction amount calculation unit 635. Furthermore, in a case where a deviation between the projection image 900 and the region of the object in the silhouette image 320 is not occurring in any imaging apparatus 2, information indicating that the number of deviation apparatuses is 0 or information indicating that effect is output to the deviation information generation unit 650.

In step S782, the deviation correction amount calculation unit 635 determines which of the external parameters and the internal parameters (including distortion) the parameters of the imaging apparatus 2 causing a deviation are or whether the parameters of the imaging apparatus 2 causing a deviation are both the external parameters and the internal parameters. The result of such determination is output to the deviation information generation unit 650. Furthermore, in a case where the number of deviation apparatuses is 0, step S782 does not need to be performed and the deviation correction amount calculation unit 635 can set the correction amount to 0 and then advance the processing to step S785.

Figure 10A:
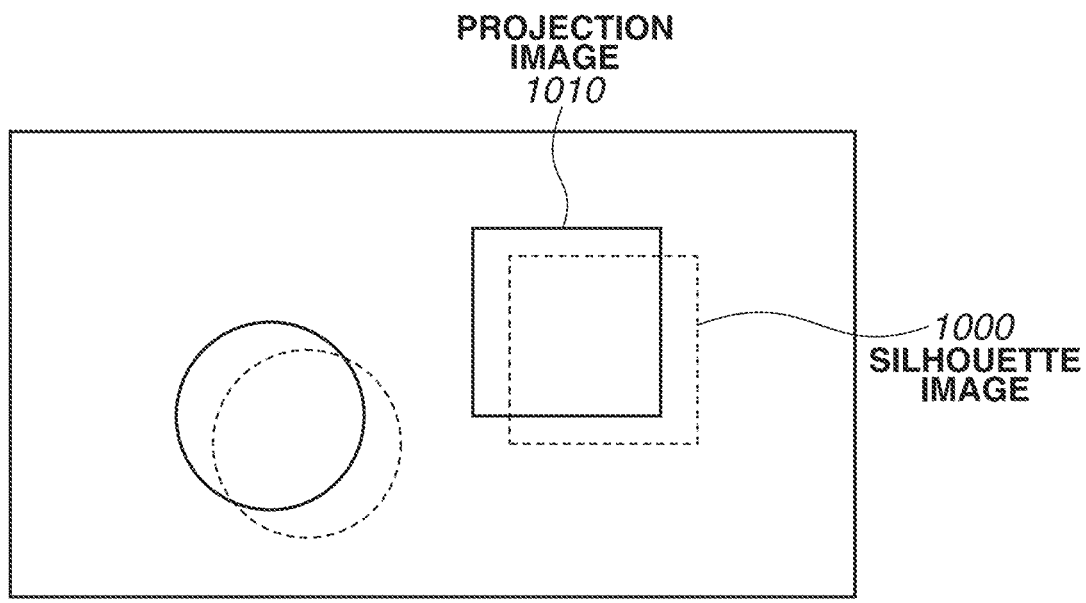
FIGS. 10A and 10B are diagrams each illustrating an example of a deviation between a projection image and the region of an object in a silhouette image, obtained when a deviation occurs in external parameters or internal parameters.
Figure 10B:
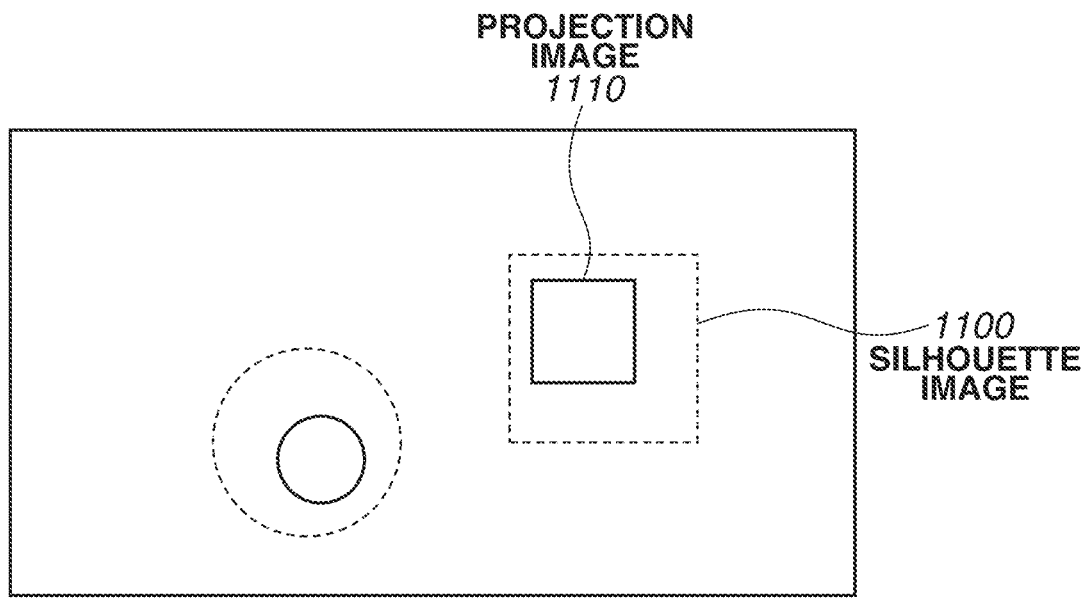

The method for the deviation correction amount calculation unit 635 to determine the type of parameters of the imaging apparatus 2 causing a deviation is described. FIG. 10A is a diagram illustrating a deviation between a silhouette image 1000 (the same as the region of the object) and a projection image 1010 occurring in a case where the external parameters have changed from those obtained at the time of calibration. In a case where the external parameters, which represent the position and orientation of the imaging apparatus 2, have changed, the region of the object in the silhouette image 1000 and the projection image 1010 deviate from each other over the entire image in such a way as to perform parallel translation. On the other hand, FIG. 10B is a diagram illustrating a deviation between the region of the object in a silhouette image 1100 and a projection image 1110 occurring in a case where the internal parameters have changed from those obtained at the time of calibration. In a case where the internal parameters, which represent the focal length of the image and the image center, have changed, the projection image 1110 appears as a visible image inside the silhouette image 1100 (the same as the region of the object) in a collapsed form. Therefore, the deviation correction amount calculation unit 635 is able to determine the type of changed parameters of the imaging apparatus 2.

The more specific determination method is as follows. First, the deviation correction amount calculation unit 635 divides a silhouette image into respective regions by an existing labeling method, and calculates a circumscribed rectangle for each region. Next, the deviation correction amount calculation unit 635 also performs labeling of the projection image to divide the projection image into respective regions. The deviation correction amount calculation unit 635 associates the closest ones of circumscribed rectangles of the respective regions of the projection image and circumscribed rectangles of the respective regions of the silhouette image with each other as regions indicating the same object. Next, the deviation correction amount calculation unit 635 calculates a difference vector from the projection image to the silhouette image at four vertices of a circumscribed rectangle of the associated regions. The deviation correction amount calculation unit 635 calculates an inner product of difference vectors at the respective vertices. If the inner product is a positive value, the deviation correction amount calculation unit 635 determines that the deviation faces in one direction, thus determining that a change in the external parameters has occurred. If, in each region, a negative value is mixed in an inner product of difference vectors at four vertices, the deviation correction amount calculation unit 635 determines that the difference vectors face the inside of the region, thus determining that a deviation in the internal parameters has occurred. The result of such determination is output to the deviation information generation unit 650.

In step S783, the deviation correction amount calculation unit 635 determines whether the detected deviation includes a deviation caused by a change in the internal parameters. If it is determined that the detected deviation includes a deviation caused by a change in the internal parameters (YES in step S783), the deviation correction amount calculation unit 635 advances the processing to step S785. On the other hand, if it is determined that the detected deviation does not includes a deviation caused by a change in the internal parameters (NO in step S783), the deviation correction amount calculation unit 635 advances the processing to step S784. Furthermore, that the detected deviation includes a deviation caused by a change in the internal parameters means a case where the detected deviation includes a deviation caused by a change in the internal parameters and a deviation caused by a change in the external parameters. Thus, in a case where the detected deviation includes only a change in the external parameters, the deviation correction amount calculation unit 635 advances the processing to step S784.

In step S784, the deviation correction amount calculation unit 635 calculates a deviation correction amount for an imaging apparatus 2 the parameters of which have changed. Specifically, in a case where the cause for a deviation is the external parameters, the deviation correction amount calculation unit 635 also calculates a deviation correction amount based on difference vectors calculated in the respective regions. For example, the deviation correction amount calculation unit 635 can calculate the average value of difference vectors calculated at four vertices of the respective regions as a deviation correction amount from the projection image to the region of the object in a silhouette image. Alternatively, the deviation correction amount calculation unit 635 can calculate the maximum value of vectors in the respective regions and set the calculated maximum value as a deviation correction amount. These deviation correction amounts are output to the virtual viewpoint image generation unit 640.

In step S785, in a case where the number of deviation apparatuses is or greater, the deviation information generation unit 650 generates, as deviation information, information that is based on a result of detection performed by the determination unit 630. For example, the deviation information generation unit 650 can generate, for example, information indicating an imaging apparatus 2 the parameters of which have changed or information indicating the number of imaging apparatuses the parameters of which have changed. More specifically, the deviation information generation unit 650 can generate, as deviation information, indicating an imaging apparatus 2 the parameters of which have changed in such a way as to be able to display the identification number of the imaging apparatus 2 on, for example, a display. Specifically, the deviation information generation unit 650 can convert the identification number of an imaging apparatus 2 in which a deviation is occurring into deviation information which is able to be displayed as text information.

Moreover, the deviation information generation unit 650 can generate, as deviation information, information indicating a cause for which a deviation has occurred. For example, the deviation information generation unit 650 can generate information indicating the type of the changed parameters, which has been determined by the deviation correction amount calculation unit 635. In other words, the deviation information generation unit 650 can generate information indicating whether the cause for which a deviation has occurred lies in the external parameters or the internal parameters or lies in both the external parameters and the internal parameters. Moreover, examples of deviation information include text information.

Moreover, the deviation information can include information for prompting the user to correct the parameters of the imaging apparatus 2. Specifically, the deviation information can include information for prompting the user to re-calculate the parameters of the imaging apparatus 2 and information for prompting the user to re-adjust, for example, the position and orientation of the imaging apparatus 2.

The deviation information is output to the display apparatus 3. Furthermore, in a case where the number of deviation apparatuses is 0, processing in step S785 is not performed. Moreover, in a case where, in step S784, the deviation correction amount has been calculated, processing in step S785 can be omitted.

In step S786, upon receiving the identification number of an imaging apparatus 2 in which a deviation has occurred and the deviation correction amount from the deviation correction amount calculation unit 635, the virtual viewpoint image generation unit 640 generates a virtual viewpoint image in consideration of the received deviation correction amount. Thus, in a case where the cause for which a deviation has occurred lies in only a change in the external parameters, the virtual viewpoint image generation unit 640 generates a virtual viewpoint image in consideration of the deviation correction amount. In a case where the cause for which a deviation has occurred lies in a change in the internal parameters, processing in step S786 is omitted.

Processing which the virtual viewpoint image generation unit 640 performs is described. In allocation of colors to voxels, up to processing for converting three-dimensional coordinates expressed by a world coordinate system into an image coordinate system of each imaging apparatus 2 is similar to processing in step S250 in the first exemplary embodiment. In a case where the imaging apparatus 2 is an imaging apparatus 2 the parameters of which have changed, in the second exemplary embodiment, the virtual viewpoint image generation unit 640 adds a correction vector (vx, vy) input as a deviation correction amount to the calculated image coordinates (x, y), thus acquiring the corrected coordinates. Then, the virtual viewpoint image generation unit 640 generates a virtual viewpoint image based on pixel values corresponding to the corrected coordinates in the captured image. The other processing operations concerning virtual viewpoint image generation are the same as processing in step S250.

The second exemplary embodiment enables the user to readily recognize the imaging apparatus 2 the parameters of which have changed. Additionally, the second exemplary embodiment enables acquiring a correction amount for correcting the parameters of some imaging apparatuses 2 and enables generating a virtual viewpoint image without re-adjusting the position and orientation of the imaging apparatus 2. Thus, since a processing time for re-generating three-dimensional shape data is not needed, the second exemplary embodiment is able to improve the image quality of a virtual viewpoint image in a small amount of time.

Moreover, the display apparatus 3 can be an apparatus which performs control and setting of parameters of the plurality of imaging apparatuses 2. In that case, correcting the parameters of the imaging apparatus 2 can be configured to be automatically performed based on the input deviation information. Specifically, for example, the position and orientation (direction) of the imaging apparatus 2 can be configured to be automatically adjusted to initial setting values. This configuration enables, without the need for the user to manually adjust, for example, the position and orientation (direction) of the imaging apparatus 2 to initial setting values, easily correcting the parameters of the imaging apparatus 2 to initial parameters.

Furthermore, while, in the above-described exemplary embodiments, an example in which deviation information is displayed by the display apparatus 3 has been described, these exemplary embodiments are not limited to this, and a configuration in which deviation information is appended to data about a virtual viewpoint image or is recorded on a recording unit (not illustrated) can be employed.

Moreover, the second exemplary embodiment can be combined with the first exemplary embodiment as appropriate.

In a third exemplary embodiment, an example of a configuration which, in a case where the number of deviation apparatuses is greater than the number of allowable deviation apparatuses mentioned in the second exemplary embodiment, operates an shape estimation parameter, re-processes a frame obtained at next time or the same frame, and acquires a shape estimation result obtained by excluding an influence of an imaging apparatus 2 the parameters of which have changed is described.

FIG. 11 illustrates a configuration of an information processing apparatus 5 in the third exemplary embodiment. The configuration of each unit of the information processing apparatus 5 is similar to that in the second exemplary embodiment. However, connections from the determination unit 630 to the shape estimation unit 610 and the setting unit 611 are added in such a way as to enable deviation information detected by the determination unit 630 to be fed back to shape estimation processing. Furthermore, the information processing apparatus 5 is configured with the hardware configuration illustrated in FIG. 15, and the hardware configuration thereof is, therefore, omitted from description here.

Figure 12:
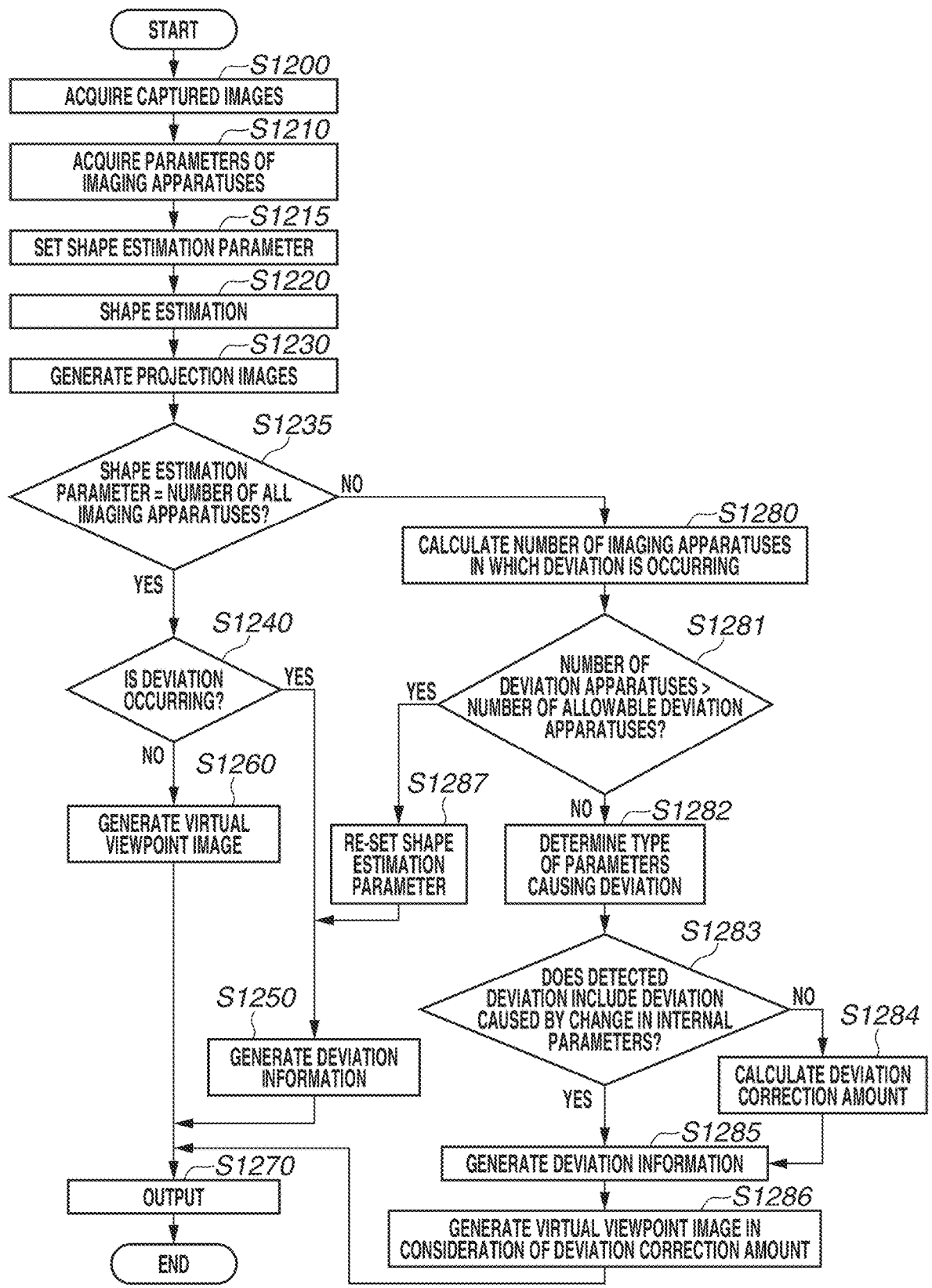
FIG. 12 is a flowchart illustrating an example of processing which is performed by the information processing apparatus in the third exemplary embodiment.

FIG. 12 illustrates a flow of processing which the information processing apparatus 5 in the third exemplary embodiment performs. However, description focuses on differences from those in the second exemplary embodiment, and steps similar to those in the second exemplary embodiment are omitted from description. Steps S1200 to S1210 are similar to steps S700 to S710 in the second exemplary embodiment, and are, therefore, omitted from description.

In step S1215, the setting unit 611 previously receives inputting of a shape estimation parameter for use in shape estimation processing via an input device such as a keyboard from the user (not illustrated), and sets the input shape estimation parameter. However, upon receiving an instruction for re-setting described below, the setting unit 611 changes the shape estimation parameter according to the received instruction.

Figure 13:
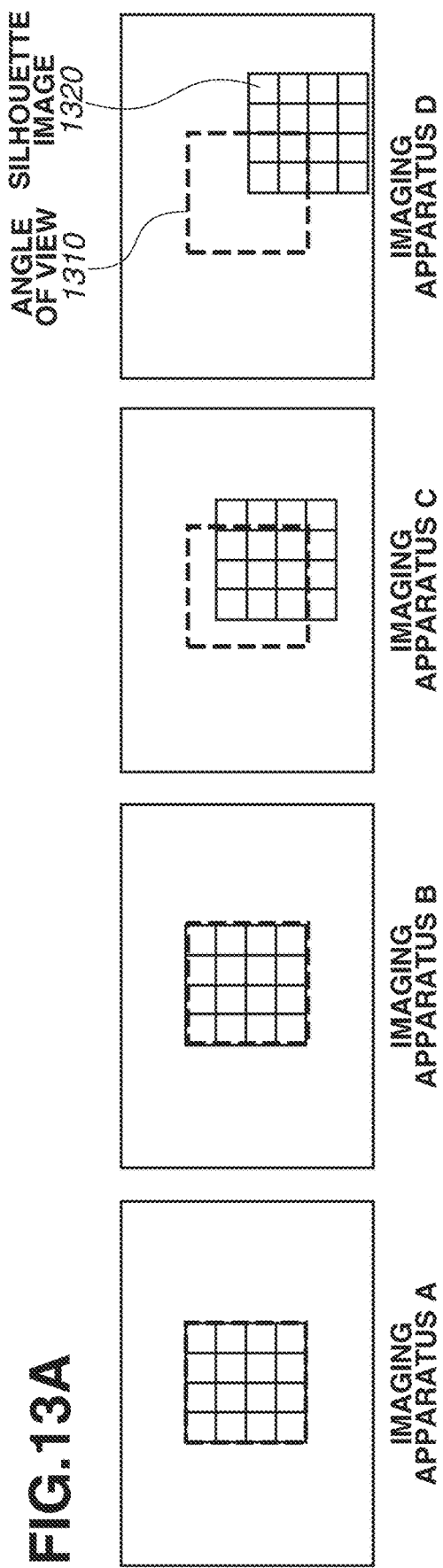
FIGS. 13A and 13B are diagrams used to explain shape estimation processing performed in the third exemplary embodiment.
Figure 14:
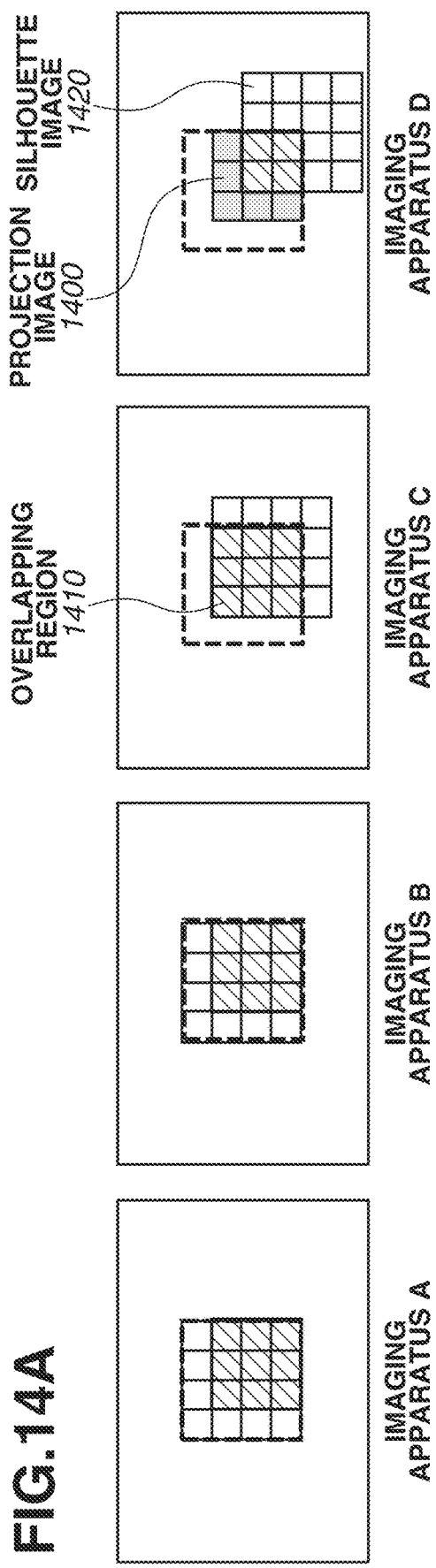
FIGS. 14A and 14B are diagrams illustrating an overlapping region between a projection image generated from a shape estimation result in the third exemplary embodiment and the region of an object in a silhouette image.

Here, changing of the setting value of, for example, a shape estimation parameter is described with reference to, for example, FIG. 13A. FIG. 13A is a diagram illustrating a case in which the angle of view 1310 and the silhouette image 1320 (the same as the region of the object) deviate from each other with respect to two imaging apparatuses C and D out of four imaging apparatuses A to D for use in image capturing. In this case, three-dimensional shape data which is generated by shape estimation processing performed in step S1220 is data represented by only voxels the number of votes obtained of which is 3 or greater, the number of votes obtained being the numerical value of the voxel 1330 illustrated in FIG. 13B. Here, assuming that the shape estimation parameter is 3, as illustrated in FIG. 14A, an overlapping region 1410 between the projection image 1400 for each imaging apparatus 2 and the region of the object in the silhouette image 1420 is displayed. Furthermore, steps S1220 to S1235 are similar to steps S720 to S735 in the second exemplary embodiment, and are, therefore, omitted from description.

In step S1280, the determination unit 630 calculates the number of deviation apparatuses. From FIG. 14A, a result indicating that the number of deviation apparatuses is 4 is obtained.

Then, in step S1281, in a case where the number of allowable deviation apparatuses is set as 1, the determination unit 630 determines that the number of deviation apparatuses exceeds the number of allowable deviation apparatuses. Thus, the result of determination in step S1281 is YES, the determination unit 630 advances the processing to step S1287.

In step S1287, the determination unit 630 performs re-setting of the shape estimation parameter. Thus, the determination unit 630 issues an instruction to the setting unit 611 to subtract 1 from the shape estimation parameter. In response to this instruction, the setting unit 611 subtracts 1 from the shape estimation parameter. The shape estimation parameter reduced by subtraction is used when the information processing apparatus 5 performs processing illustrated in FIG. 12 in the next and subsequent frames.

Then, processing in steps S1250 and S1270 is similar to processing in steps S750 and S770 in the second exemplary embodiment, and is, therefore, omitted from description.

Moreover, processing in steps S1240, S1260, and S1280 to S1286 is similar to processing in steps S740, S760, S780 to S786 in the second exemplary embodiment, and is, therefore, omitted from description.

The shape estimation parameter which has been re-set via step S1287 becomes 2. Thus, the shape estimation parameter which is set in step S1215 in the next and subsequent frames becomes 2. In this case, three-dimensional shape data which is generated in the shape estimation processing performed in step S1220 is data represented by only voxels the number of votes obtained of which is 2 or greater, the number of votes obtained being the numerical value of the voxel 1330 illustrated in FIG. 13B. Thus, an overlapping region 1510 between the projection image 1500 for each imaging apparatus 2 and the silhouette image 1520 (the same as the region of the object) becomes a result such as that illustrated in FIG. 14B. With respect to the imaging apparatuses A and B, there becomes no deviation between the projection image 1500 and the region of the object in the silhouette image 1520. In this case, in step S1281, the determination unit 630 determines that the number of deviation apparatuses does not exceed the number of allowable deviation apparatuses (NO in step S1281). Then, the determination unit 630 advances the processing to step S1282 and subsequent steps.

Moreover, the determination unit 630 can be configured to output, to the shape estimation unit 610, information indicating that the imaging apparatuses C and D are imaging apparatuses the parameters of which have changed. The shape estimation unit 610 can be configured to perform shape estimation using the volume intersection method without using imaging apparatuses 2 the parameters of which have changed. This way enables obtaining, although different from a result obtained by performing shape estimation using all of the imaging apparatuses 2 when no deviation occurs, an estimation result obtained by excluding an influence of shape deterioration caused by an imaging apparatus 2 the parameters of which have changed.

Moreover, in the third exemplary embodiment, after re-setting of a shape estimation parameter, reprocessing for generating three-dimensional shape data based on a plurality of captured images obtained at the same clock time can be performed.

Moreover, the third exemplary embodiment can be combined with the first or second exemplary embodiment as appropriate.

Figure 16:
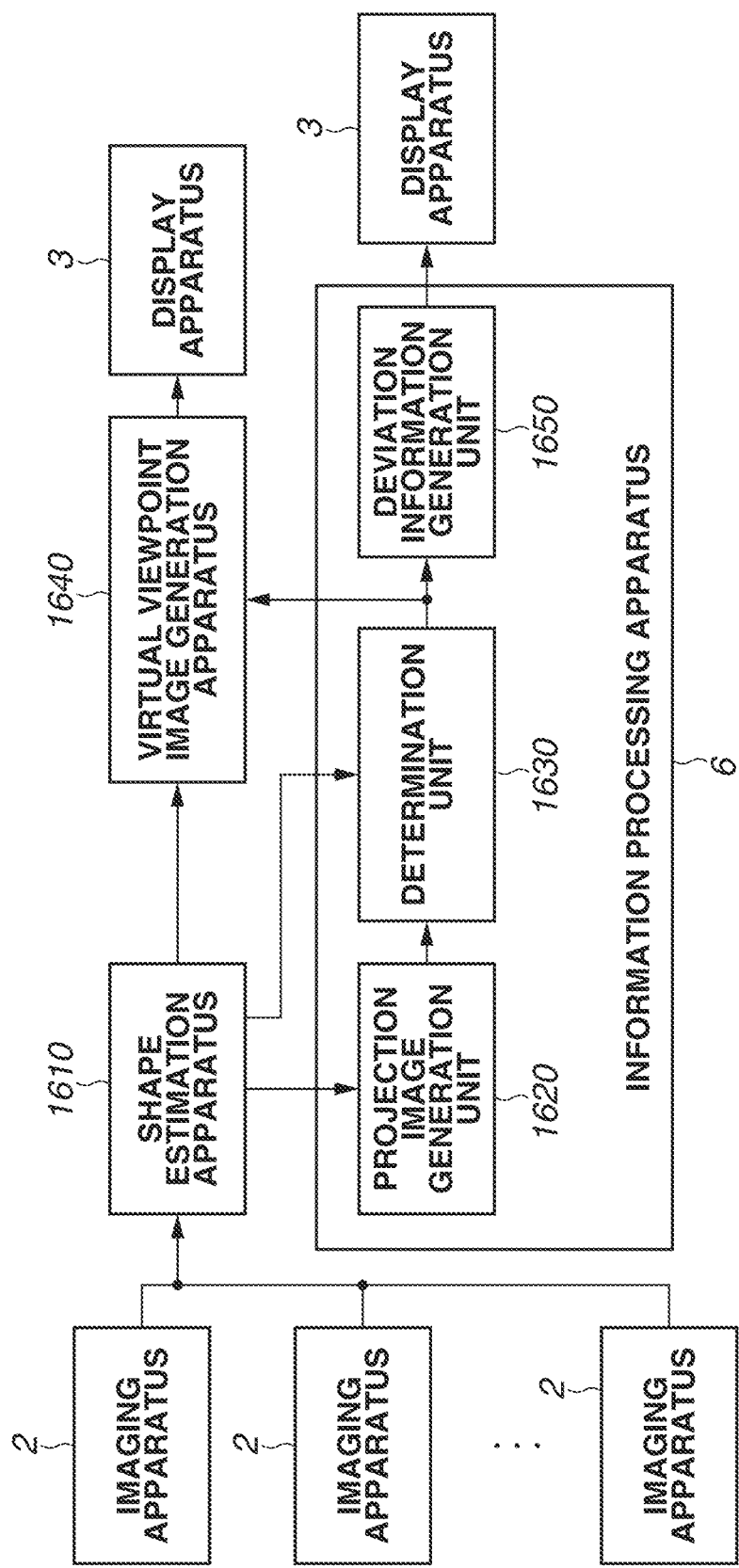
FIG. 16 is a diagram illustrating an example of a functional configuration of an information processing apparatus in a fourth exemplary embodiment.

While, in the above-described first to third exemplary embodiments, a configuration in which the information processing apparatus includes a shape estimation unit and a virtual viewpoint image generation unit has been described, a fourth exemplary embodiment described below is directed to a configuration in which the information processing apparatus does not include a shape estimation unit and a virtual viewpoint image generation unit. FIG. 16 is a diagram illustrating an image processing system in the fourth exemplary embodiment. The image processing system in the fourth exemplary embodiment includes a shape estimation apparatus 1610, a virtual viewpoint image generation apparatus 1640, and an information processing apparatus 6. Additionally, the image processing system can include a plurality of imaging apparatuses 2 and a display apparatus 3. Furthermore, each of the information processing apparatus 6, the shape estimation apparatus 1610, and the virtual viewpoint image generation apparatus 1640 is configured with the hardware configuration illustrated in FIG. 15, and the hardware configuration thereof is omitted from description here.

Here, the shape estimation apparatus 1610 has the functions of the above-mentioned acquisition unit and shape estimation unit, and the virtual viewpoint image generation apparatus 1640 has the functions of the above-mentioned virtual viewpoint image generation unit.

Moreover, the information processing apparatus 6 includes a projection image generation unit 1620, a determination unit 1630, and a deviation information generation unit 1650.

Figure 2:
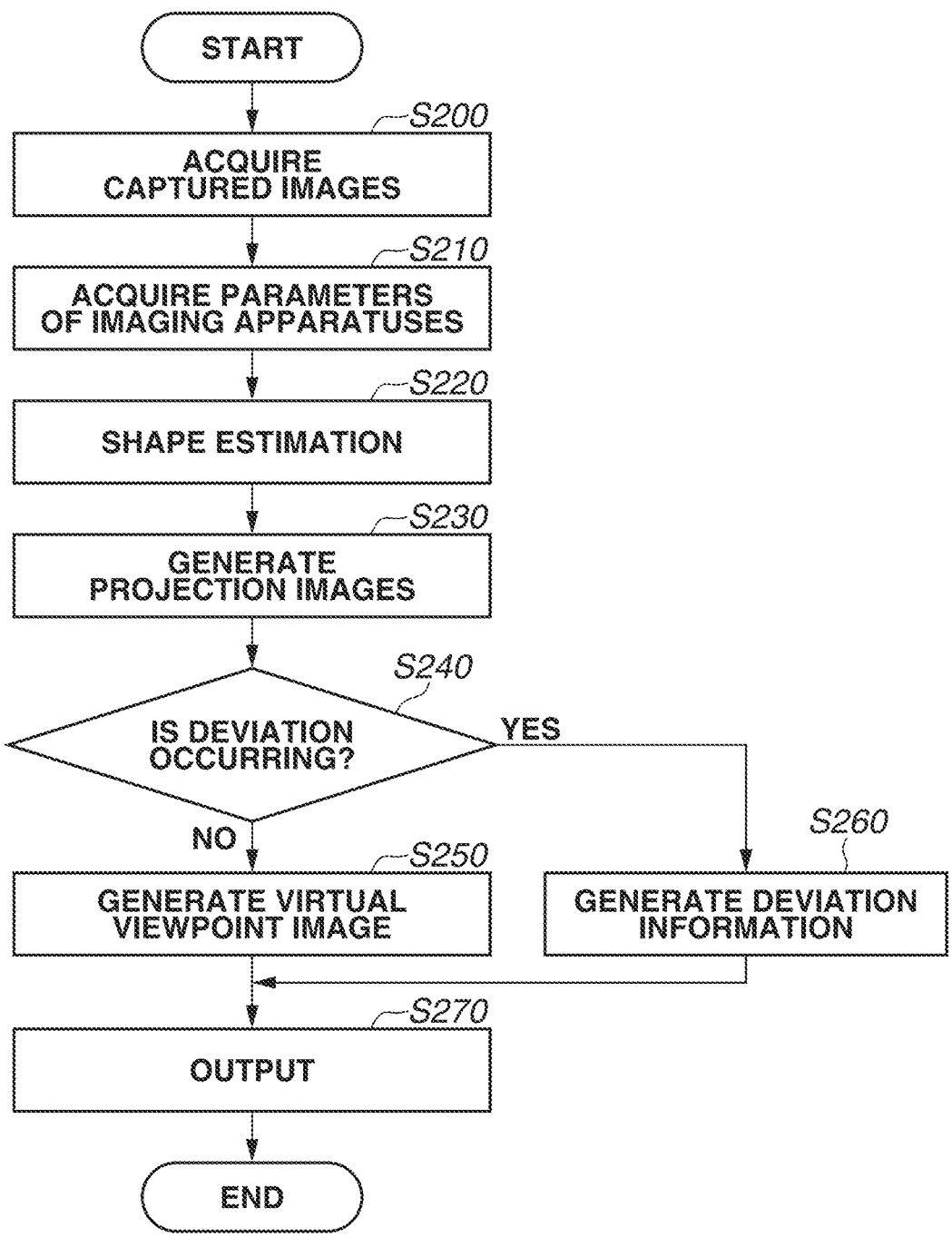
FIG. 2 is a flowchart illustrating an example of processing which is performed by the information processing apparatus in the first exemplary embodiment.

Processing which is performed by the image processing system in the fourth exemplary embodiment is similar to the processing illustrated in FIG. 2. However, there is a difference in the entity which performs an operation. Specifically, steps S200 to S220 are performed by the shape estimation apparatus 1610. The information processing apparatus 6 performs steps S230, S240, and S260. Step S250 is performed by the virtual viewpoint image generation apparatus 1640. Furthermore, step S270 may be performed by the virtual viewpoint image generation apparatus 1640 or may be performed by the information processing apparatus 6.

The entities for processing in steps S230, S240, and S260 which are performed by the information processing apparatus 6 are as follows. Specifically, step S230 is performed by the projection image generation unit 1620. Step S240 is performed by the determination unit 1630. Step S260 is performed by the deviation information generation unit 1650.

Furthermore, the determination unit 1630 determines whether to generate a virtual viewpoint image depending on a result of detection. Moreover, for example, in a case where, as illustrated in FIG. 5, even if deviation information is generated, a virtual viewpoint image is also generated, the deviation information can be output from the deviation information generation unit 1650 to the virtual viewpoint image generation apparatus 1640.

Moreover, the fourth exemplary embodiment can be combined with at least one of the first to third exemplary embodiments as appropriate.

The present disclosure can also be implemented by processing which supplies a program for implementing one or more functions of the above-described exemplary embodiments to a system or apparatus via a storage medium and causes one or more processors in a computer of the system or apparatus to read out and execute the program. Moreover, the present disclosure can also be implemented by a circuit which implements one or more functions thereof (for example, an application specific integrated circuit (ASIC)).

Moreover, aspects of the present disclosure can also be achieved by the following method. A storage medium storing program code of software for implementing the functions of the above-described exemplary embodiments is supplied to a system or apparatus. A computer (or a CPU or micro processing unit (MPU)) of the system or apparatus reads out and executes the program code stored in the storage medium.

In this case, the program code itself read out from the storage medium implements the functions of the above-described exemplary embodiments, and the storage medium storing the program code configures the present disclosure.

Examples of the storage medium for supplying the program code include a flexible disc, a hard disk, an optical disc, a magneto-optical disc, a compact disc read-only memory (CD-ROM), a CD recordable (CD-R), a magnetic tape, a non-volatile memory card, and a ROM.

Moreover, aspects of the present disclosure also include a case where the functions of the above-described exemplary embodiments are implemented by the following processing.

For example, an operating system (OS) which is operating on a computer performs a part or the whole of actual processing based on an instruction of program code read out by the computer.

Additionally, aspects of the present disclosure also include a case where the functions of the above-described exemplary embodiments are implemented by the following processing. First, program code read out from a storage medium is written in a memory included in a function expansion board inserted into a computer or a function expansion unit connected to a computer. Next, for example, a CPU included in the function expansion board or the function expansion unit performs a part or the whole of actual processing based on an instruction of the program code.

The above-described various aspects of the present disclosure enable detecting a change in the state of an imaging apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™) a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2019-129613 filed Jul. 11, 2019, which is hereby incorporated by reference herein in its entirety.

What is claimed is:

1. An information processing apparatus comprising:
one or more memories storing instructions; and
one or more processors which executes the stored instructions causing the information processing apparatus to:
acquire a plurality of images that is based on image capturing performed by a plurality of imaging apparatuses at a first time;
generate three-dimensional shape data of an object based on the acquired plurality of images and states of the plurality of imaging apparatuses at a second time earlier than the first time;
generate a plurality of projection images by projecting the generated three-dimensional shape data of the object based on the states of the plurality of imaging apparatuses at the second time, one of the plurality of projection images corresponding to one of the plurality of imaging apparatuses;
compare the one of the plurality of projection images with a region of the object in an image captured by the one of the plurality of imaging apparatuses,
determine a deviation between a state of the one of the plurality of imaging apparatuses at the first time and the state of the one of the plurality of imaging apparatuses at the second time, based on the comparison;
determine whether to generate a virtual viewpoint image or to generate deviation information without generating a virtual viewpoint image based on the determined deviation; and
generate deviation in a case where it is determined to generate deviation information.

2. The information processing apparatus according to claim 1, further comprising:
acquire states of the plurality of imaging apparatuses obtained at the second time; and
generate a projection image of an object corresponding to each of the plurality of imaging apparatuses based on the states acquired and the three-dimensional shape data acquired.

3. The information processing apparatus according to claim 1, wherein the deviation is expressed by a proportion of the projection image of the object generated to the region of the object in each image.

4. The information processing apparatus according to claim 1, wherein, based on the deviation, an amount of correction of a state of an imaging apparatus a state of which obtained at the first time is different from a state thereof obtained at the second time is calculated.

5. The information processing apparatus according to claim 1, wherein the information that is based on the result of detection includes information indicating that a state of one of the plurality of imaging apparatuses obtained at the first time is different from a state thereof obtained at the second time.

6. The information processing apparatus according to claim 1, wherein the information that is based on the result of detection includes information indicating an imaging apparatus a state of which obtained at the first time is different from a state thereof obtained at the second time.

7. The information processing apparatus according to claim 1, wherein the information that is based on the result of detection includes information indicating a number of imaging apparatuses a state of each of which obtained at the first time is different from a state thereof obtained at the second time.

8. The information processing apparatus according to claim 1, wherein the information that is based on the result of detection includes information indicating a type of a state which has changed.

9. The information processing apparatus according to claim 1, wherein the information that is based on the result of detection includes information indicating prompting correction of a state of the imaging apparatus.

10. The information processing apparatus according to claim 1, wherein a state of the imaging apparatus obtained at the second time is acquired.

11. The information processing apparatus according to claim 1, wherein the state of the imaging apparatus obtained at the second time is a state at a stage of advance preparation of image capturing which is performed by the plurality of imaging apparatuses.

12. The information processing apparatus according to claim 11, wherein a state of the imaging apparatus obtained at the second time is acquired, and
wherein a state at the stage of advance preparation of image capturing is acquired which is performed by the plurality of imaging apparatuses from a storage device in which the state at the stage of advance preparation of image capturing which is performed by the plurality of imaging apparatuses is stored.

13. An information processing method comprising:
acquiring a plurality of images that is based on image capturing performed by a plurality of imaging apparatuses at a first time;
generating three-dimensional shape data of an object based on the acquired plurality of images and states of the plurality of imaging apparatuses at a second time earlier than the first time;
generating a plurality of projection images by projecting the generated three-dimensional shape data of the object based on the states of the plurality of imaging apparatuses at the second time, one of the plurality of projection images corresponding to one of the plurality of imaging apparatuses;
comparing the one of the plurality of projection images with a region of the object in an image captured by the one of the plurality of imaging apparatuses;
determining a deviation between a state of the one of the plurality of imaging apparatuses at the first time and the state of the one of the plurality of imaging apparatuses at the second time, based on the;
determining whether to generate a virtual viewpoint image or to generate deviation information without generating a virtual viewpoint image based on the determined deviation; and
generating deviation information in a case where it is determined to generate deviation information.

14. A non-transitory computer-readable storage medium storing computer-executable instructions that, when executed by a computer, cause the computer to perform an information processing method comprising:
acquiring a plurality of images that is based on image capturing performed by a plurality of imaging apparatuses at a first time;
generating three-dimensional shape data of an object based on the acquired plurality of images and states of the plurality of imaging apparatuses at a second time earlier than the first time;
generating a plurality of projection images by projecting the generated three-dimensional shape data of the object based on the states of the plurality of imaging apparatuses at the second time, one of the plurality of projection images corresponding to one of the plurality of imaging apparatuses;
comparing the one of the plurality of projection images with a region of the object in an image captured by the one of the plurality of imaging apparatuses;
determining a deviation between a state of the one of the plurality of imaging apparatuses at the first time and the state of the one of the plurality of imaging apparatuses at the second time, based on the;
determining whether to generate a virtual viewpoint image or to generate deviation information without generating a virtual viewpoint image based on the determined deviation; and
generating deviation information in a case where it is determined to generate deviation information.

15. An information processing apparatus comprising:
one or more memories storing instructions; and
one or more processors which executes the stored instructions causing the information processing apparatus to:
acquire a plurality of images that is based on image capturing performed by a plurality of imaging apparatuses at a first time;
generate three-dimensional shape data of an object based on the acquired plurality of images and states of the plurality of imaging apparatuses at a second time earlier than the first time of the image capturing;
generate a plurality of projection images by projecting the generated three-dimensional shape data of the object based on the states of the plurality of imaging apparatuses at the second time, one of the plurality of projection images corresponding to one of the plurality of imaging apparatuses;
compare the one of the plurality of projection images with a region of the object in an image captured by the one of the plurality of imaging apparatuses;
a third acquisition unit configured to acquire states of the plurality of imaging apparatuses obtained at the second time;
generate a projection image of the object corresponding to each of the plurality of imaging apparatuses based on a deviation between the states of the comparison; and
display based on deviation information on the projection image of the object generated.

16. The information processing apparatus according to claim 1, wherein the deviation information is generated information indicating that parameters have changed in any imaging apparatus out of the plurality of imaging apparatuses.

* * * * *